United States Patent
Hirakawa

(10) Patent No.: US 9,462,160 B2
(45) Date of Patent: Oct. 4, 2016

(54) COLOR CORRECTION DEVICE, METHOD, AND PROGRAM

(71) Applicant: NEC Corporation, Minato-ku, Tokyo (JP)

(72) Inventor: Yasufumi Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/646,536

(22) PCT Filed: Nov. 19, 2013

(86) PCT No.: PCT/JP2013/006776
§ 371 (c)(1),
(2) Date: May 21, 2015

(87) PCT Pub. No.: WO2014/080613
PCT Pub. Date: May 30, 2014

(65) Prior Publication Data
US 2015/0334267 A1  Nov. 19, 2015

(30) Foreign Application Priority Data
Nov. 22, 2012  (JP) .................................. 2012-255981

(51) Int. Cl.
*H04N 5/225* (2006.01)
*H04N 1/60* (2006.01)
(Continued)

(52) U.S. Cl.
CPC ............. *H04N 1/6027* (2013.01); *G06T 7/408* (2013.01); *H04N 1/6086* (2013.01); *H04N 1/62* (2013.01);
(Continued)

(58) Field of Classification Search
CPC ..................................... H04N 1/6027
USPC ........................................... 348/242, 207.99
See application file for complete search history.

(56) References Cited

U.S. PATENT DOCUMENTS

2006/0055784 A1* 3/2006 Sugihara ................ H04N 9/735
348/207.99

FOREIGN PATENT DOCUMENTS

| JP | 2009-065290 A | 3/2009 |
|---|---|---|
| JP | 2009-212787 A | 9/2009 |
| JP | 2011-181014 A | 9/2011 |
| WO | 2012/099013 A1 | 7/2012 |

OTHER PUBLICATIONS

Omar Javed, Khurram Shafique, Zeeshan Rasheed, Mubarak Shah, "Modeling Inter-camera Space-time and Appearance Relationships for Tracking across Non-overlapping Views", Computer Vision and Image Understanding (CVIU), vol. 109, Issue 2, 2008, pp. 146 to 162.

(Continued)

*Primary Examiner* — Joel Fosselman

(57) ABSTRACT

It is made possible to easily correct the color tone changing from region to region in an image without the need of preparing a color chart for each region where the color tone changes due to factors such as light source change. A color correction device comprises: moving object detection means 101 which detects a moving object in input video images; position-specific color information acquisition means 102 which judges the identity of the detected moving object in the video images, thereby acquires the position of the moving object along with its movement and information representing the color of the moving object in each image, and stores the position of the moving object along with its movement and the information representing the color of the moving object in each image in position-specific color information storage means 103 while associating them with each other; color-stable region estimation means 104 which estimates color-stable regions in the shooting area based on the information representing the relationship between the position and the color of the moving object; color correction parameter calculation means 108 which calculates color conversion parameters between color-stable regions based on the result of the estimation of the color-stable regions and information on color in each color-stable region; and color correction means 106 which corrects colors of the correction target image by using the color conversion parameters between color-stable regions.

14 Claims, 11 Drawing Sheets

(51) Int. Cl.
- *H04N 9/07* (2006.01)
- *G06T 7/40* (2006.01)
- *H04N 5/14* (2006.01)
- *H04N 9/73* (2006.01)
- *H04N 1/62* (2006.01)

(52) U.S. Cl.
CPC ............... *H04N 5/144* (2013.01); *H04N 9/07* (2013.01); *H04N 9/735* (2013.01); *G06T 2207/10016* (2013.01); *G06T 2207/10024* (2013.01)

(56) References Cited

OTHER PUBLICATIONS

Bryan Prosser, Shaogang Gong, and Tao Xiang, "Multi-camera Matching under Illumination Change over Time", Workshop on Multi-camera and Multi-modal Sensor Fusion Algorithms and Applications-M2SFA2, 2008.

International Search Report for PCT Application No. PCT/JP2013/006776, mailed on Feb. 25, 2014.

\* cited by examiner

F I G. 13
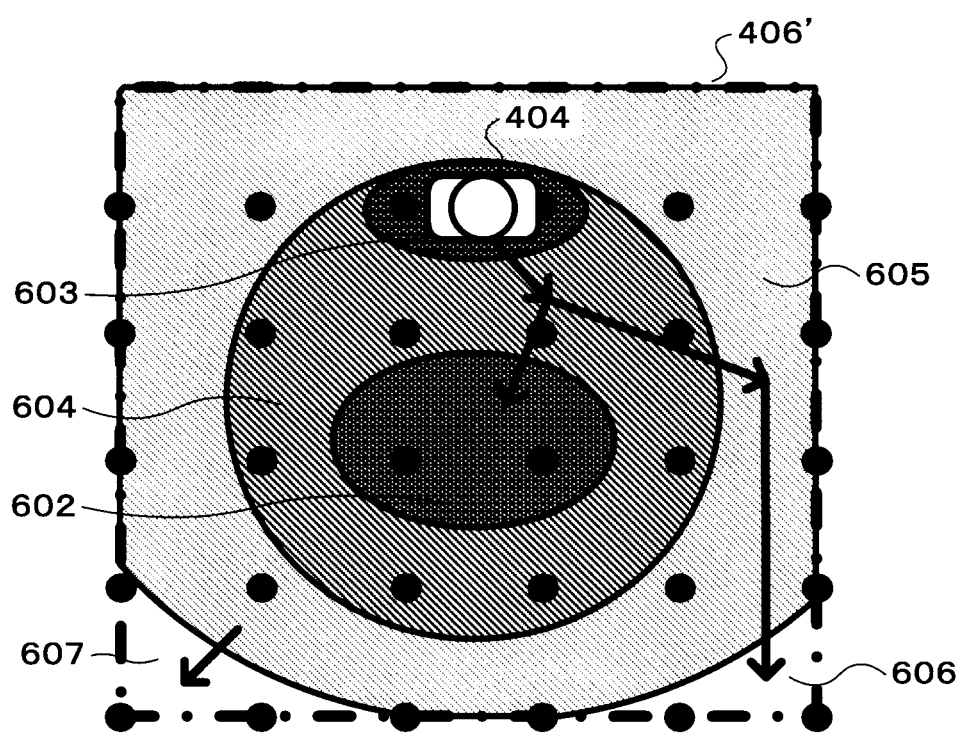

COLOR CORRECTION DEVICE, METHOD, AND PROGRAM

This application is a National Stage Entry of PCT/JP2013/006776 filed on Nov. 19, 2013, which claims priority from Japanese Patent Application 2012-255981 filed on Nov. 22, 2012, the contents of all of which are incorporated herein by reference, in their entirety.

TECHNICAL FIELD

The present invention relates to a color correction device, a color correction method and a color correction program for correcting colors in an image.

BACKGROUND ART

When images of the entrance of a building such as a retail store are shot with a surveillance camera or the like, incidence of light from multiple light sources (e.g., incidence of external light and illuminating light in the building) causes a problem in that the color tone changes greatly from position to position even in images shot by the same camera due to the influence of the light. If the color tone changes from region to region in an image, it becomes difficult to make a judgment on a particular color of clothing (as one of the features of a person), the identity of a person, etc. based on images shot with a surveillance camera or the like.

Examples of a method for correcting the color tone of an image include a method of performing the color correction by using a color chart on which a plurality of colors as the reference (natural colors, chromatic colors, primary colors, gray scale, etc.) are arranged. According to this method, the color tone of an image shot with a camera can be corrected by calculating color correction parameters for the image based on the result of shooting the color chart.

There are also methods of performing the color correction by using a brightness transfer function (e.g., Non-patent Literatures 1 and 2). The Non-patent Literature 1 describes examples of the brightness transfer function for making the object association (object re-identification) between cameras differing in the color tone. For example, the color of the clothing of a person A, wearing apparently blue clothing in an image shot with a camera A, can be recognized as light blue in an image shot with a camera B due to a change in the color tone. This method makes it possible to determine the identity of objects in images shot by different cameras even when the cameras differ in the color tone, by associating image feature values of the blue clothing and the light blue clothing with each other.

Non-patent Literature 2 describes a brightness transfer function designed by taking light source fluctuation into consideration.

CITATION LIST

Non-Patent Literature

Non-Patent Literature 1
 Omar Javed, Khurram Shafique, Zeeshan Rasheed, Mubarak Shah, "Modeling Inter-camera Space-time and Appearance Relationships for Tracking across Non-overlapping Views", Computer Vision and Image Understanding (CVIU), Vol 109, Issue 2, 2008, Pages 146 to 162
Non-Patent Literature 2
 Bryan Prosser, Shaogang Gong, and Tao Xiang, "Multi-camera Matching under Illumination Change over Time", Workshop on Multi-camera and Multi-modal Sensor Fusion Algorithms and Applications-M2SFA2, 2008

SUMMARY OF INVENTION

Technical Problem

However, even though just using a color chart makes is possible to correct the overall color tone of an image shot with a camera, the method cannot deal with the correction of the color tone of an object varying from position to position in the shooting area of the camera. While shooting images of the color chart at multiple positions is possible, it is difficult to properly set conditions of shooting the color chart (e.g., appropriate granularity of the shooting position setting) and the cost of the shooting is necessitated to rise. Further, the method using a color chart cannot properly deal with changes in the light source(s) along with the passage of time.

Furthermore, the technology described in the Non-patent Literature 1, aiming to make the object association (object re-identification) between cameras differing in the color tone, does not assume the changes in the light source(s) (light source change) from position to position in images shot by one camera. In other words, the Non-patent Literature 1 has no description about identical person association (person re-identification) between images shot by one camera) for the purpose of detecting the light source change in the camera.

Moreover, since the technology of the Non-patent Literature 1 regards the time of changing the camera for shooting the object as the timing (time) of the color change of the object, the technology is incapable of detecting the color change on each pixel in the same camera. The technology described in the Non-patent Literature 2 also has the same problem in this regard.

It is therefore the primary object of the present invention to provide a color correction device, a color correction method and a color correction program with which the color tone changing from region to region in an image can be corrected with ease without the need of preparing a color chart for each region where the color tone changes due to factors such as the light source change.

Solution to Problem

A color correction device in accordance with an aspect of the present invention comprises: moving object detection means which detects a moving object in video images whose shooting area is identical with or entirely includes the shooting area of a correction target image; position-specific color information acquisition means which judges the identity of the moving object detected by the moving object detection means in the video images and thereby acquires the position of the moving object along with its movement and information representing the color of the moving object in each image; position-specific color information storage means which stores the position of the moving object along with its movement and the information representing the color of the moving object in each image acquired by the position-specific color information acquisition means while associating them with each other; color-stable region estimation means which estimates color-stable regions, as regions in the shooting area where color is stable, based on the information representing the relationship between the position and the color of the moving object which has been stored in the position-specific color information storage means; color conversion parameter calculation means which calculates color conversion parameters, as parameters for converting colors between color-stable regions, based on the result of the estimation by the color-stable region estimation means and the information representing the relationship between the position and the color of the moving object which has been stored in the position-specific color information storage means; and color correction means which corrects colors of the correction target image by using the color conversion parameters between color-stable regions calculated by the color conversion parameter calculation means.

A color correction method in accordance with an aspect of the present invention comprises: detecting a moving object in video images whose shooting area is identical with or entirely includes the shooting area of a correction target image; judging the identity of the detected moving object in the video images, thereby acquiring the position of the moving object along with its movement and information representing the color of the moving object in each image, and storing the position of the moving object along with its movement and the information representing the color of the moving object in each image in storage means while associating them with each other; estimating color-stable regions, as regions in the shooting area where color is stable, based on the information representing the relationship between the position and the color of the moving object which has been stored in the storage means; calculating color conversion parameters, as parameters for converting colors between color-stable regions, based on the result of the estimation of the color-stable regions and the information representing the relationship between the position and the color of the moving object which has been stored in the storage means; and correcting colors of the correction target image by using the calculated color conversion parameters between color-stable regions.

A color correction program in accordance with an aspect of the present invention causes a computer to execute: a process of detecting a moving object in video images whose shooting area is identical with or entirely includes the shooting area of a correction target image; a process of judging the identity of the detected moving object in the video images, thereby acquiring the position of the moving object along with its movement and information representing the color of the moving object in each image, and storing the position of the moving object along with its movement and the information representing the color of the moving object in each image in storage means while associating them with each other; a process of estimating color-stable regions, as regions in the shooting area where color is stable, based on the information representing the relationship between the position and the color of the moving object which has been stored in the storage means; a process of calculating color conversion parameters, as parameters for converting colors between color-stable regions, based on the result of the estimation of the color-stable regions and the information representing the relationship between the position and the color of the moving object which has been stored in the storage means; and a process of correcting colors of the correction target image by using the calculated color conversion parameters between color-stable regions.

Advantageous Effects of the Invention

According to the present invention, the color tone changing from region to region in an image can be corrected with ease without the need of preparing a color chart for each region where the color tone changes due to factors such as the light source change.

BRIEF DESCRIPTION OF DRAWINGS

FIG. 13 It depicts a schematic diagram for explaining a method for calculating region-specific color correction parameters.

DESCRIPTION OF EMBODIMENTS

First Exemplary Embodiment

Figure 1:
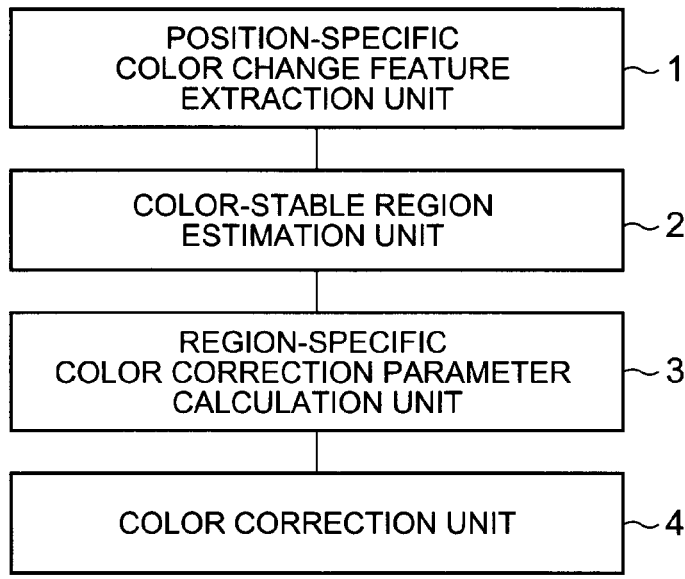
FIG. 1 It depicts a block diagram showing an example of the configuration of a color correction device in accordance with a first exemplary embodiment of the present invention.

Referring now to the drawings, a description will be given in detail of exemplary embodiments in accordance with the present invention. FIG. 1 is a block diagram showing an example of the configuration of a color correction device in accordance with a first exemplary embodiment of the present invention. The color correction device shown FIG. 1 comprises a position-specific color change feature extraction unit 1, a color-stable region estimation unit 2, a region-specific color correction parameter calculation unit 3, and a color correction unit 4.

The position-specific color change feature extraction unit 1 extracts a color change feature of an image (image color change feature) at each position in a shooting area. For example, the position-specific color change feature extraction unit 1 may extract a region where a moving object has been shot (hereinafter referred to as a "moving object region") from video images shot by a fixed camera, keep track of the moving object region (tracking process), and extract information representing the relationship between the position of the moving object region and color and the relationship between the position of the moving object region and color change. The position-specific color change feature extraction unit 1 stores the extracted information in storage means (unshown). For example, the information representing the relationship between the position of the moving object region and color can be information associating the position in the shooting area with information representing color (in the image) at the position (e.g., image feature values) in regard to the moving object region under consideration. The information representing the relationship between the position in the shooting area and color change can be information associating the position in the shooting area with information representing the amount of color change (in the image) between the position and adjacent positions in regard to the moving object region under consideration.

For example, the position-specific color change feature extraction unit 1 may extract a color histogram as the information representing color. The position-specific color change feature extraction unit 1 may calculate distance between histograms as the information representing the amount of color change. The distance between histograms can be calculated by using the histogram intersection, for example. The calculation of the amount of color change is desired to include directional information (i.e., information indicating the direction from which the moving object approached a certain position). The difference between histogram intersections can be associated with the position and the direction.

The position-specific color change feature extraction unit 1 performs the tracking in regard to multiple moving objects and thereby extracts the information representing the relationship between the position of the moving object region in the shooting area and color and the relationship between the position of the moving object region in the shooting area and color change. By this process, the position-specific color change feature extraction unit 1 extracts the image color change feature (information indicating what type of color change occurred between each region and adjacent regions) in regard to principal positions in the shooting area.

Although the color correction of the image frame can be made by using tracking result of only one moving object, the use of tracking result of a lot of moving objects is desirable for the purpose of increasing the accuracy. This is because depending on only one moving object can lead to accuracy deterioration due to shadows and noise in the images and changes in the object region caused by certain factors.

The color-stable region estimation unit 2 estimates color-stable regions by generating an image feature value change model (representing a color feature change amount (the amount of change in image feature values regarding color) at each position) based on the information extracted by the position-specific color change feature extraction unit 1. Here, the "color-stable region" means a region in the shooting area where color is stable, that is, color change hardly occurs.

For example, the color-stable region estimation unit 2 may generate the image feature value change model representing the color feature change amount at each position, regard regions where the color feature change amount is large as boundary regions, and estimate each region partitioned by such boundary regions and having a small color feature change amount as a color-stable region. In this case, each region (area) partitioned by boundary regions and having a small color feature change amount is estimated as a color-stable region under the same illumination condition.

The region-specific color correction parameter calculation unit 3 calculates color correction parameters for each color-stable region estimated by the color-stable region estimation unit 2. For example, in cases where reference colors (e.g., color chart) have already been shot under an illumination condition, the region-specific color correction parameter calculation unit 3 may calculate the color correction parameters for the region under consideration (color-stable region in which an object having a reference color is situated) based on the result of shooting the reference colors. Once the color correction parameters are calculated in one color-stable region, the color correction parameters for the other color-stable regions can also be calculated based on the information representing the relationship between the position in the shooting area and color which has been extracted by the position-specific color change feature extraction unit 1.

In cases where no image obtained by shooting reference colors is inputted, the region-specific color correction parameter calculation unit 3 may calculate the color correction parameters in each color-stable region with reference to the color tone in one color-stable region in the correction target image so that the color tone in each of the other color-stable regions gets close to the color tone as the reference.

The color correction unit 4 corrects the colors of the correction target image based on the color correction parameters of each color-stable region calculated by the region-specific color correction parameter calculation unit 3. The color correction unit 4 may correct the colors in the target image in regard to each color-stable region by using the color correction parameters calculated for each color-stable region.

In this exemplary embodiment, the position-specific color change feature extraction unit 1, the color-stable region estimation unit 2, the region-specific color correction parameter calculation unit 3 and the color correction unit 4 are implemented by, for example, an information processing device (e.g., CPU) that operates according to a program. Although illustration is omitted in the drawings, the color correction device may be equipped with a storage device for storing the image color change feature at each position extracted by the position-specific color change feature extraction unit 1, information on the color-stable regions estimated by the color-stable region estimation unit 2, the color correction parameters of each color-stable region calculated by the region-specific color correction parameter calculation unit 3, information on the correction target image, information on the image after the correction, and so forth as needed.

Figure 2:
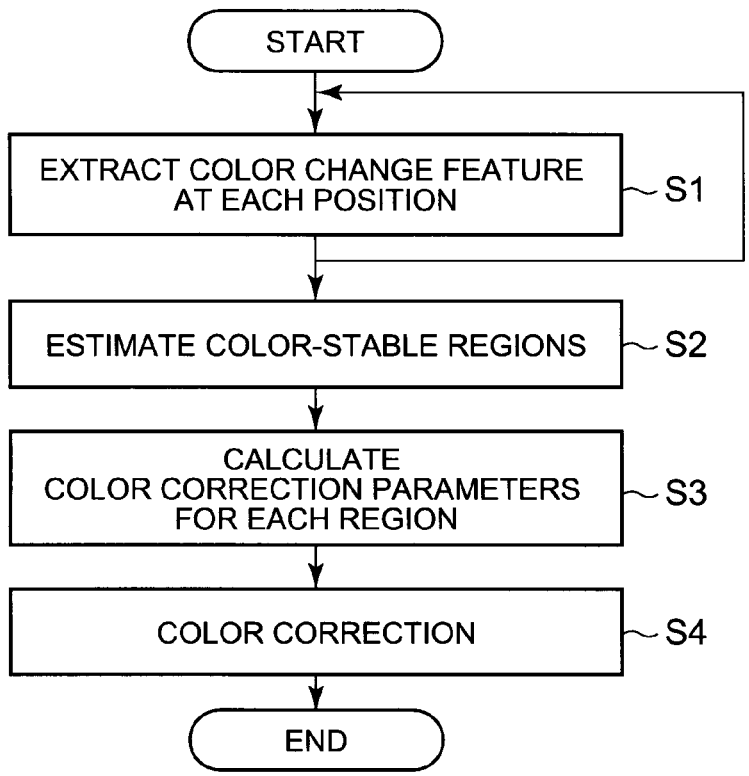
FIG. 2 It depicts a flow chart showing an example of the operation of the color correction device in the first exemplary embodiment.

Next, the operation of this exemplary embodiment will be explained below by referring to FIG. 2. FIG. 2 is a flow chart showing an example of the operation of this exemplary embodiment. When video images whose shooting area is identical with or entirely includes the shooting area of the correction target image are inputted, the position-specific color change feature extraction unit 1 extracts the image color change feature at each position (step S1) as shown in FIG. 2.

Subsequently, the color-stable region estimation unit 2 estimates the color-stable regions in the shooting area of the correction target image or the input video images based on the result of the extraction by the position-specific color change feature extraction unit 1 (step S2). For example, the color-stable region estimation unit 2 generates the image feature value change model representing the color feature change amount at each position in the shooting area of the correction target image based on the information representing the relationship between the position in the shooting area and color change extracted by the position-specific color change feature extraction unit 1 and then estimates the color-stable regions based on the magnitude of the color feature change amount at each position indicated by the generated image feature value change model. Incidentally, since it is assumed that the shooting area of the correction target image and that of the input video image are identical with each other or the correspondence between the two shooting areas is already known, once the color-stable regions are determined in one of the shooting areas, the color-stable regions in the other shooting area are also determined as a matter of course.

Subsequently, the region-specific color correction parameter calculation unit 3 calculates the color correction parameters for each color-stable region (step S3). For example, the region-specific color correction parameter calculation unit 3 calculates the color correction parameters for each color-stable region based on the information on the color-stable regions estimated by the color-stable region estimation unit 2 and the information representing the relationship between the position in the shooting area and color extracted by the position-specific color change feature extraction unit 1.

After the region-specific color correction parameters (color correction parameters of each color-stable region) have been calculated by the region-specific color correction parameter calculation unit 3, the color correction unit 4 corrects the colors of the correction target image based on the color correction parameters calculated by the region-specific color correction parameter calculation unit 3 (step S4). In regard to the boundary regions, the correction can be made based on the position-specific color information (color information on each position). However, it is sufficient in this exemplary embodiment to prepare the color correction parameters at least for each color-stable region and make the color correction to each color-stable region by using the color correction parameters.

As described above, according to this exemplary embodiment, the color change of the moving object at each position is grasped, the color-stable regions are estimated based on the status of color change at each position, and the color correction parameters are calculated for each color-stable region based on the color at each position of the color-stable region. Therefore, even in cases where the color tone varies from region to region in one image due to the influence of light (e.g., when light is incident upon the shooting area of the fixed camera (e.g., surveillance camera) from multiple types of light sources), the color tone varying from region to region can be corrected with ease.

In the conventional technologies, the person association (person re-identification) between different cameras is made in a limited region. However, the extraction of the color-stable regions and the process of tracking a moving object in the shooting area of the camera and associating the color of the object with positional information in order to acquire information on the status of color change in each color-stable region are not carried out in the conventional technologies. In contrast, in this exemplary embodiment, a moving object in the shooting area of the camera is tracked by using image feature values or the like, information associating the color of the object with positional information is acquired, and the presence/absence (or the degree) of color change between regions is estimated based on the acquired information. Then, the color-stable regions are estimated based on the estimated presence/absence of color change between regions. On that basis, the color correction parameters are calculated for each of the estimated color-stable regions based on the status of color change of the moving object. As above, the estimation of the color-stable regions and the calculation of the color correction parameters for each color-stable region are conducted by using the characteristics of color change (presence/absence and status of color change) accompanying the movement of the moving object. Therefore, the color tone varying from region to region in an image can be corrected with ease. Thus, according to this exemplary embodiment, it becomes possible to correct the colors in an image so that the color tone of the same object does not change from position to position in the shooting area and to correct the colors in an image so that the color tone of each color in the image becomes close to that of the original color, without the need of arranging the color chart at multiple positions.

The position-specific color change feature extraction unit 1 and the color-stable region estimation unit 2 in this exemplary embodiment may also be configured to estimate time-specific color-stable regions (color-stable regions at each time) by extracting the image color change feature at each position and at each time and generating an image feature value change model representing the color feature change amount at each position and at each time based on the result of the extraction. With such a configuration, regions with color change can be detected at any time even with no explicit timing of change (such as camera switching). Therefore, the color correction device of this exemplary embodiment is capable of properly dealing with the changes in the light source(s) along with the passage of time.

Second Exemplary Embodiment

Figure 3:
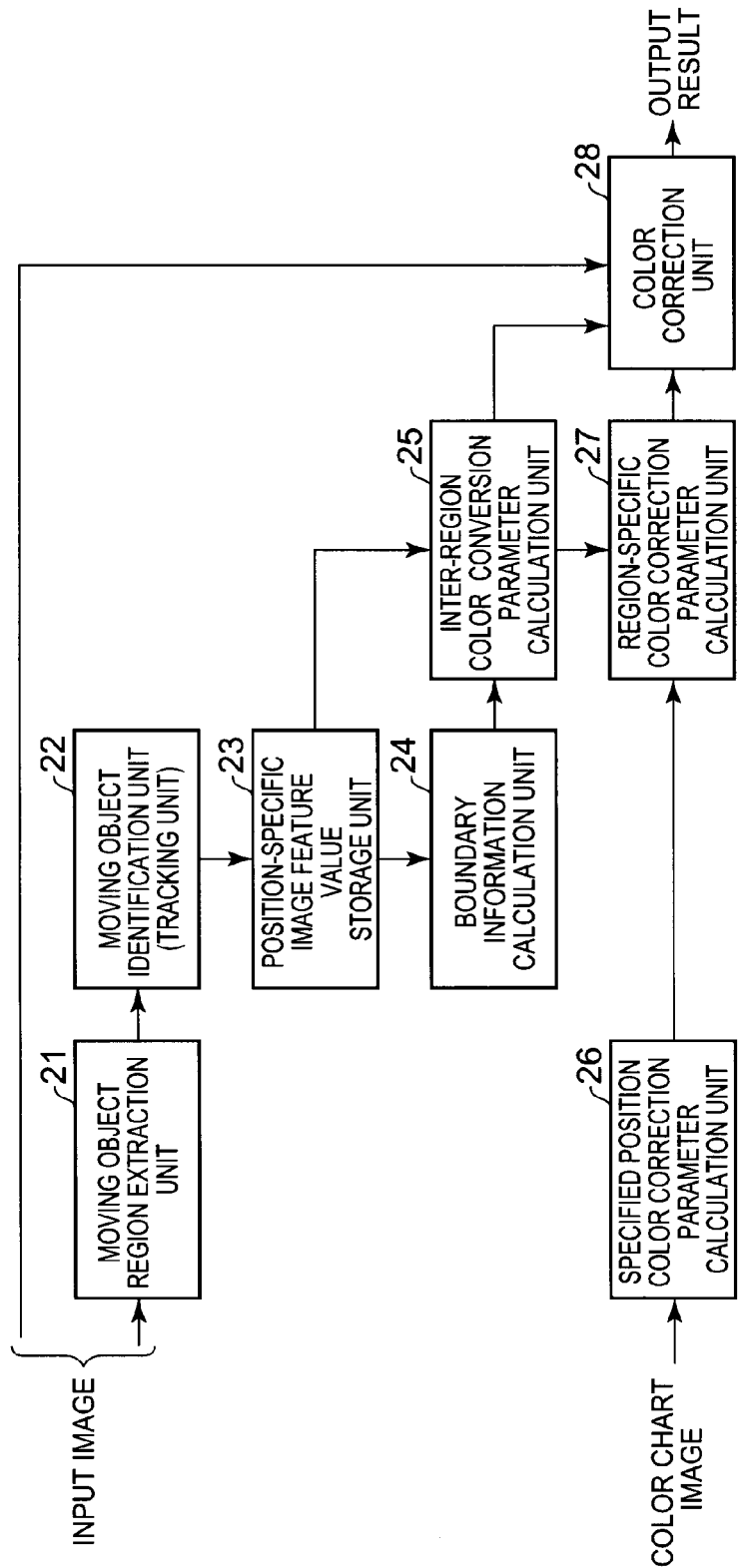
FIG. 3 It depicts a block diagram showing an example of the configuration of a color correction device in accordance with a second exemplary embodiment of the present invention.

FIG. 3 is a block diagram showing an example of the configuration of a color correction device in accordance with a second exemplary embodiment of the present invention. The color correction device of this exemplary embodiment is an example of a more specific configuration of the color correction device of the first exemplary embodiment shown in FIG. 1. The color correction device shown in FIG. 3 comprises a moving object region extraction unit 21, a moving object identification unit 22, a position-specific image feature value storage unit 23, a boundary information calculation unit 24, an inter-region color conversion parameter calculation unit 25, a specified position color correction parameter calculation unit 26, a region-specific color correction parameter calculation unit 27, and a color correction unit 28.

In this exemplary embodiment, video images shot by a fixed camera are used as the input images. The correction target image is an image shot by the same fixed camera. One or more frames included in the input images may also be handled as correction target images. The input images are not restricted to video images shot by a fixed camera as long as the input images are video images whose shooting area is identical with or entirely includes the shooting area of the correction target image. The input images can also be multiple kinds of video images shot by multiple fixed cameras as long as the relationship between their shooting areas and the actual positions is already known.

The moving object region extraction unit 21 extracts a moving object from video images when the video images are inputted thereto. Specifically, the moving object region extraction unit 21 extracts a region where a moving object is situated (hereinafter referred to as an "object region") from the input images. The extraction of the object region may be performed by finding a pixel change between images. For example, it is possible to calculate the background difference or the inter-frame difference and detect a pixel region having a nonzero difference as the object region.

For the extraction of the object region, the moving object region extraction unit 21 may also perform an object detection process by employing template matching or a discriminator (discrimination model) generated by learning. For example, in order to judge whether something shot in the region extracted as a region having a nonzero difference is a moving object or not, it is possible to generate a discriminator that has learned the feature values of images of common types of moving objects and perform an object judgment process by inputting image information on the extracted region to the generated discriminator. The support vector machine (SVM), AdaBoost, etc. are usable as the discriminator.

The moving object region extraction unit 21 also extracts image feature values representing color and image feature values for the tracking from the extracted object region for an identification process and a position-specific image feature value calculation process which will be executed later.

Specifically, the image feature values representing color can be a color histogram in a color space (RGB, HSV, L*a*b, L*u*v, etc.), for example. The image feature values for the tracking vary depending on the algorithm employed. For example, the image feature values for the tracking can be the aforementioned image feature values representing color, edge feature values, and/or feature values representing local regions (Haar-like, HOG, SIFT, SURF, etc.). The image feature values representing color and the image feature values for the tracking are not restricted to these examples.

When object discrimination (object recognition) or the like has already been conducted, the moving object region extraction unit 21 may extract the image feature values of only a specified position of the object. For example, when person discrimination (person recognition) has already been conducted, the moving object region extraction unit 21 may extract the image feature values of only the upper body of the person.

The moving object identification unit 22 performs the tracking of the moving object in the input video images based on the image feature values of the object region extracted by the moving object region extraction unit 21. Specifically, the moving object identification unit 22 performs an object region identification process (for the object region extracted by the moving object region extraction unit 21) between frames of the input video images. For example, the moving object identification unit 22 may perform the tracking, thereby judge the identity of each moving object whose position is changing, and assign an ID representing the identity to moving objects extracted from multiple frames if the extracted moving objects are judged to be identical. In cases where a person is tracked by use of a pan-tilt-zoom (PTZ) camera or the like, the moving object identification unit 22 may also record the changes in the angle of view and the magnification ratio of the PTZ camera.

The tracking of the object can be conducted by using a tracking technology that estimates the movement of the object (a moving/changing region detected from the image difference or the like or an object extracted by means of pattern matching or an object discriminator (SVM, AdaBoost, etc.)) based on image feature values of the color, the edge, etc. of the object, for example. Specifically, mean-shift tracking, a particle filter, the KLT method, a Kalman filter, etc. are usable.

The position of the moving object in each frame is determined by the identification process described above. By the determination of the position of the moving object in each frame of the video data shot by the fixed camera, positional information on the moving object, such as the moving path of the moving object in the shooting region and the position of the moving object at each time of movement, is determined. The conversion from the position in each frame image to the position in the shooting region (actual position) can be made by using a previously registered conversion formula or a conversion formula calculated from camera parameters.

The position-specific image feature value storage unit 23 stores the position of the object (object position) and the image feature values representing color while associating them with each other. For example, the object position may be defined as the position of a lower end part of the object region extracted by the moving object region extraction unit 21. When the object has been judged as a person by the discriminator, the object position may be defined as the underfoot position of the person. When a PTZ camera is used, positional relationship among the shooting areas changing with time is registered together with the object position and the image feature values representing color. It is also possible to define and recognize the shooting area in the real world as a three-dimensional shooting region and set positional information in the three-dimensional region or simply set positional information in each image (pixel position, etc.).

When the panning angle of the camera is changed by 15 degrees, for example, identical positions before and after the change have to be recognized. In cases where the changes in the angle of view and magnification ratio have already been extracted by the identification process, the moving object identification unit 22 may extract identical positions based on the information on the changes in the angle of view and magnification ratio and register the identical positions in the position-specific image feature value storage unit 23. It is also possible to extract the identical positions of the object by using the image feature values. In this case, a judgment on the position identity may be made by using SURF (Speeded Up Robust Features), SIFT (Scale Invariant Feature Transform) feature values, template matching, etc.

The boundary information calculation unit 24 estimates the color-stable regions by calculating positions in the shooting region (real space) where color change occurs (boundary regions) based on the information associating the object position with the image feature values representing color which has been stored in the position-specific image feature value storage unit 23.

For example, the boundary information calculation unit 24 may generate an image feature value change model, representing the amounts of change in the image feature values (representative values) between each partial region (obtained by partitioning the shooting region into a plurality of partial regions) and adjacent regions, based on the information associating the object position with the image feature values representing color which has been stored in the position-specific image feature value storage unit 23. Then, by using the generated image feature value change model, the boundary information calculation unit 24 may judge whether each partial region includes a region with a great color change compared to the adjacent regions or not or whether the boundary between each partial region and the adjacent regions is a region with a great color change or not by means of threshold processing or the like. If the partial region is judged to include a region with a great color change or the boundary is judged to be a region with a great color change, the boundary information calculation unit 24 may judge that a shooting region (in the real space) corresponding to the region belongs to a boundary region where the color tone is unstable. Each region (area) partitioned by such boundary regions (determined as above) and having a small color change may be estimated as a color-stable region under the same illumination condition. For example, regions each having at least a prescribed size or more as a continuous region (without being divided by boundary regions) and having only small changes in the image feature values may be extracted as such regions (areas) partitioned by boundary regions and having small color changes.

When the judgment is made on whether the boundary between each partial region and the adjacent regions is a region with a great color change or not, the result of aggregating (collecting and processing data of) the change amount between each partial region under consideration and adjacent regions may be configured to include information on a direction representing the adjacent region as the object of the calculation of the change amount from the partial region under consideration, and a position (in the shooting region in the real space) corresponding to a boundary point (on the boundary with an adjacent region) represented by the direction may be extracted as a position where color change occurs. Then, it is possible to regard the extracted positions (where color change occurs) as boundary positions and estimate each region (area) partitioned by such boundary positions and having no color change as a color-stable region under the same illumination condition. In cases where the boundary positions are not continuous, an interpolation process or the like may be conducted in order to make the boundary positions continuous.

Figure 4:
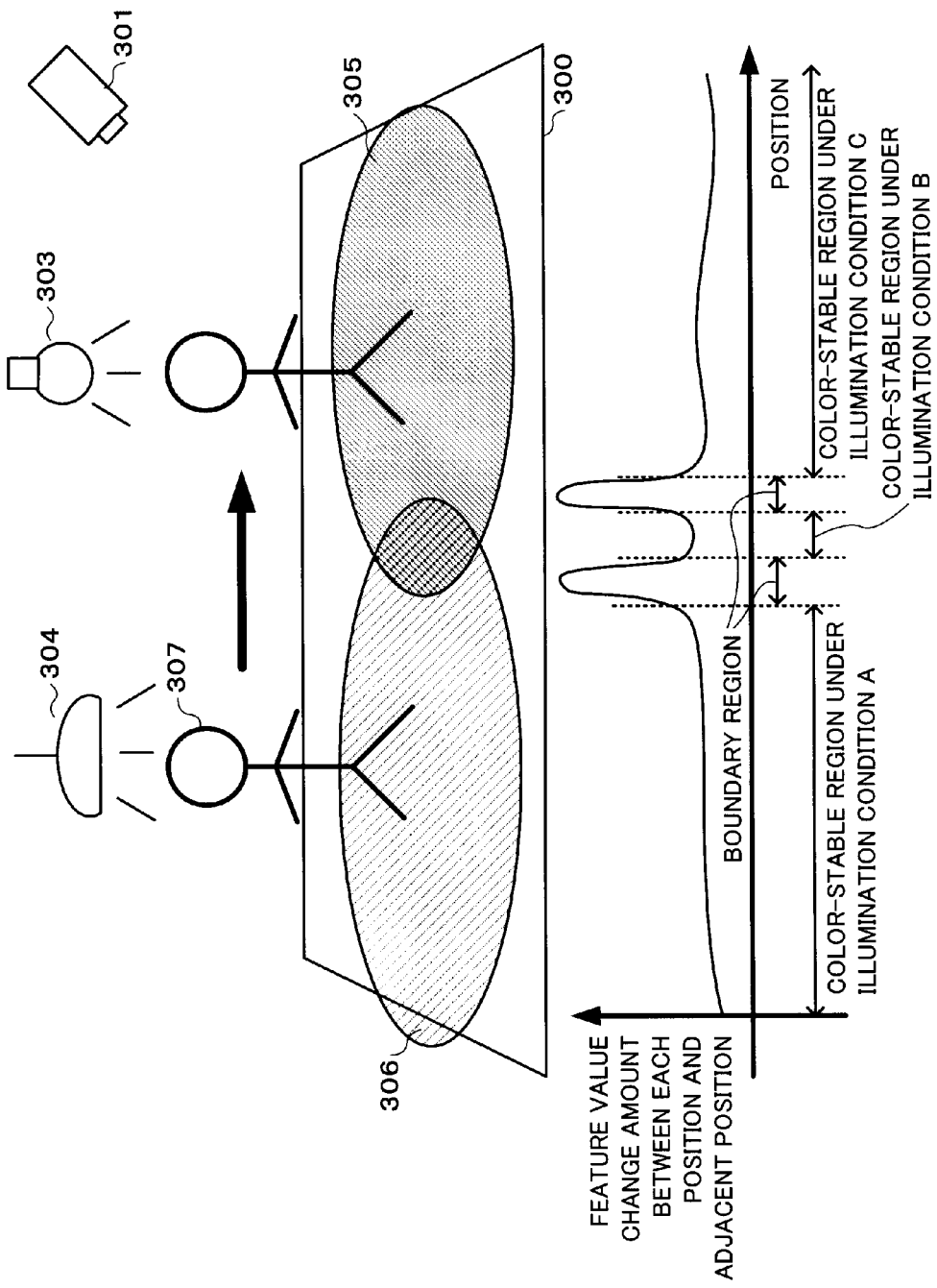
FIG. 4 It depicts an explanatory drawing showing an example of boundary regions and color-stable regions.

FIG. 4 is an explanatory drawing showing an example of the boundary regions and the color-stable regions. In the example of FIG. 4, the shooting area 300 of a fixed camera 301 is illuminated with two different illuminators 303 and 304. The illumination area 305 of the illuminator 303 and the illumination area 306 of the illuminator 304 partially overlap with each other. Thus, the shooting area 300 includes a region included in the illumination area 305, a region included in the illumination area 306, and a region included in the illumination areas 305 and 306. The example of FIG. 4 indicates that three color-stable regions partitioned by two boundary regions have been estimated as the result of conducting the tracking of a person 307, etc. in such a situation. Specifically, FIG. 4 shows an example of detection of three color-stable regions: a color-stable region under an illumination condition A, a color-stable region under an illumination condition B and a color-stable region under an illumination condition C. Here, the color-stable region under the illumination condition A corresponds to the region illuminated with only the illuminator 304. The color-stable region under the illumination condition B corresponds to the region illuminated with the illuminators 303 and 304. The color-stable region under the illumination condition C corresponds to the region illuminated with only the illuminator 303.

A more concrete method will be explained below. First, based on the result of the tracking, the boundary information calculation unit 24 calculates a difference in the image feature values of the color of the moving object successively extracted in the order of the time line (e.g., distance between histograms) as the image feature value change amount (amount of change in the image feature values). For example, the boundary information calculation unit 24 may calculate the difference between the image feature values of the color of the moving object at time t and the image feature values of the color of the moving object at time t+1. In this case, the positional information and moving direction information are stored at the same time.

Then, the boundary information calculation unit 24 aggregates the image feature value change amounts calculated at each position and thereby calculates an image feature value change amount representing each position. In the aggregation process, it is possible to imaginarily divide the region in which the object is movable (e.g., base) into partial regions and carry out the calculation/aggregation of the image feature value change amounts between adjacent partial regions. While the method of dividing the region into partial regions is not particularly limited, it is possible to divide the region into rectangular partial regions, for example.

The boundary information calculation unit 24 may also be configured to set a plurality of imaginary measurement reference points instead of setting the partial regions. In this case, the boundary information calculation unit 24 may make association with positional information closest to each measurement reference point and calculate and aggregate the image feature value change amounts between adjacent measurement reference points.

For example, the boundary information calculation unit 24 may store the calculated image feature value change amount while associating it with each adjacent partial region or measurement reference point used for the calculation and information on the object of comparison. A representative value of the image feature value change amount at each position is obtained by calculating the image feature value change amount at each object movement in regard to multiple objects and aggregating and modeling the calculated image feature value change amounts.

The model for the calculation of the representative value of the image feature value change amount can be, for example, a model for calculating the average and the variance of the collected image feature value change amounts at each position. In this case, normalization of the change amounts may be conducted since the number of collected change amounts varies from region/point to region/point. In order to make the calculated representative value better coincide with the actual status of light source change, it is possible to conduct removal of values that seem to correspond to a shadow or noise according to prescribed rules, an interpolation process to make the boundary regions continuous, and so forth.

Figure 5:
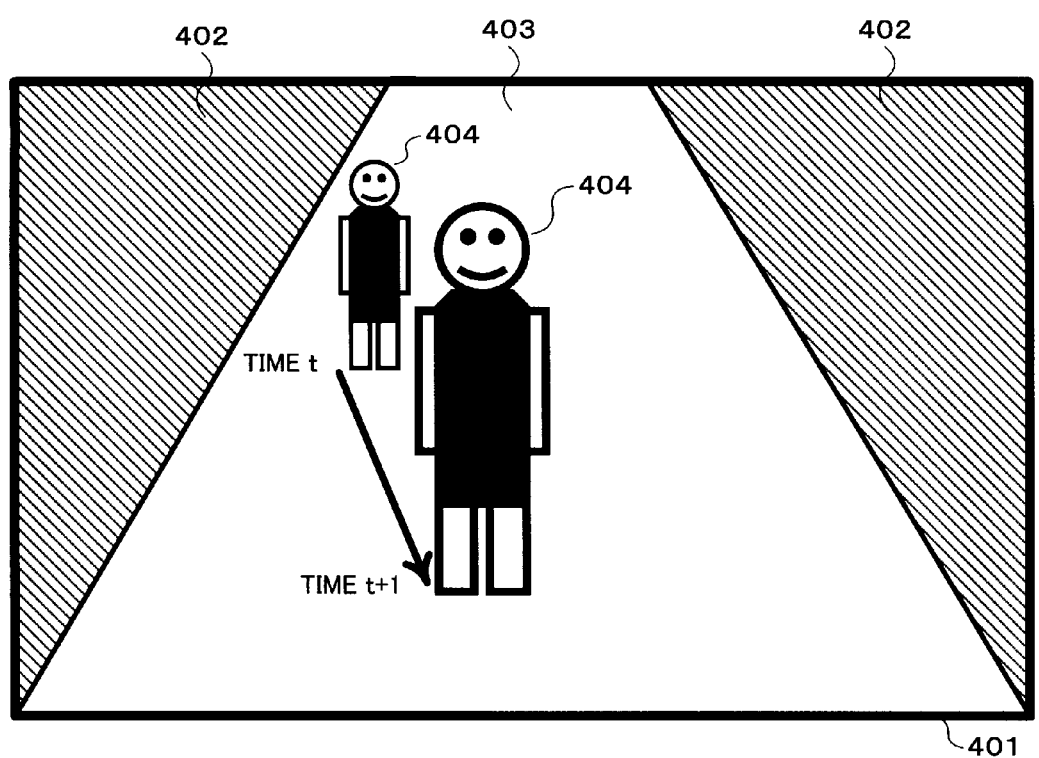
FIG. 5 It depicts a schematic diagram for explaining a method for aggregating image feature value change amounts at each position.

FIG. 5 to FIG. 8 are schematic diagrams for explaining methods for aggregating the image feature value change amounts at each position. FIG. 5 is an explanatory drawing showing an example of a camera view image. In FIG. 5, the reference character 401 represents the frame area, 402 represents a wall, and 403 represents a floor surface. The example of FIG. 5 indicates that movement of a person 404 in the illustrated direction (to the left front (from the viewpoint of the person 404)) between time t and time t+1 was shot in the camera view image in the frame area 401.

Figure 6:
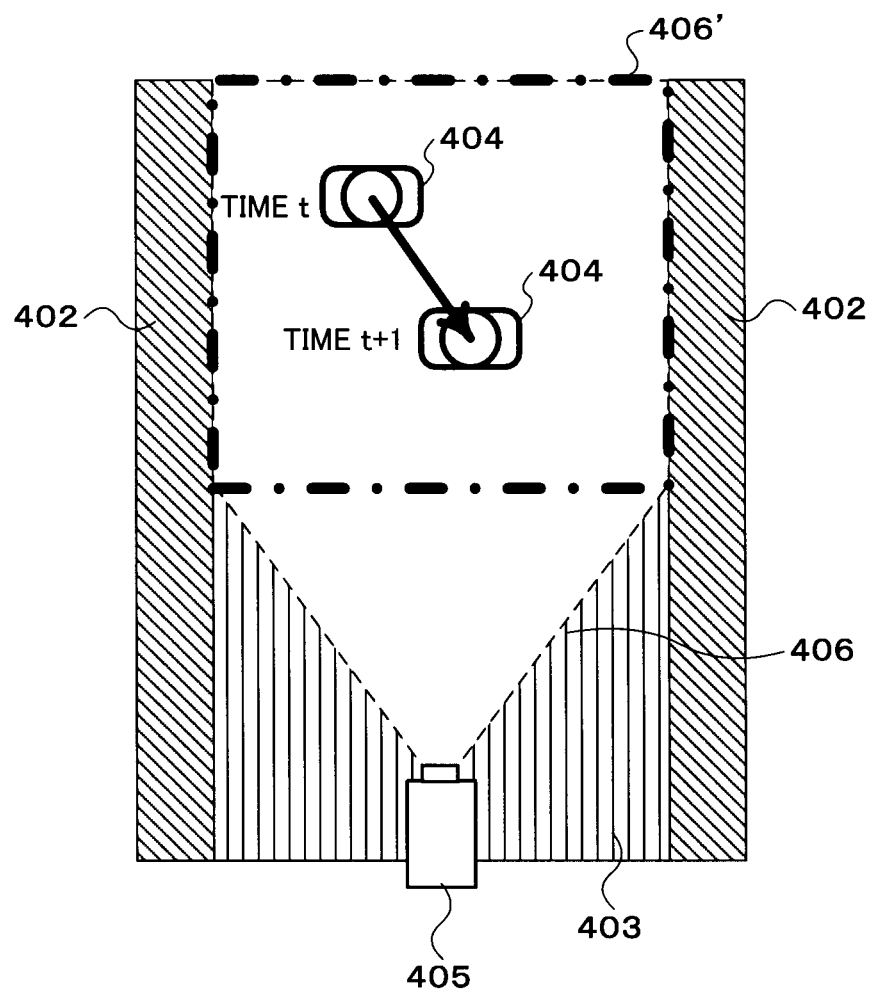
FIG. 6 It depicts a schematic diagram for explaining the method for aggregating the image feature value change amounts at each position.

FIG. 6 is a top view showing positional relationship regarding the object (in the frame area shown in FIG. 5) in the real world. In FIG. 6, the shooting area of a camera 405 is indicated by the broken lines 406. The chain line 406' indicates a floor surface region included in the shooting area.

Figure 7:
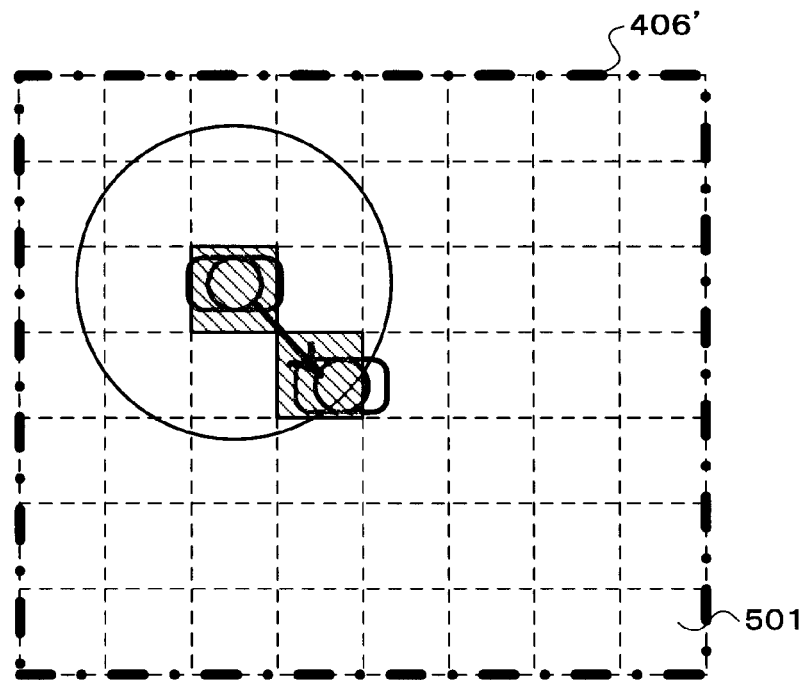
FIG. 7 It depicts a schematic diagram for explaining the method for aggregating the image feature value change amounts at each position.

FIG. 7 is an explanatory drawing showing an example of dividing the floor surface region 406' in the shooting area into rectangular partial regions. For example, the boundary information calculation unit 24 may divide the floor surface region 406' in the shooting area into a plurality of partial regions 501 as shown in FIG. 7, successively calculate the image feature value change amounts between adjacent partial regions (see the hatched regions), and aggregate the calculated image feature value change amounts. Incidentally, the partial regions do not necessarily have to be rectangular regions.

Figure 8:
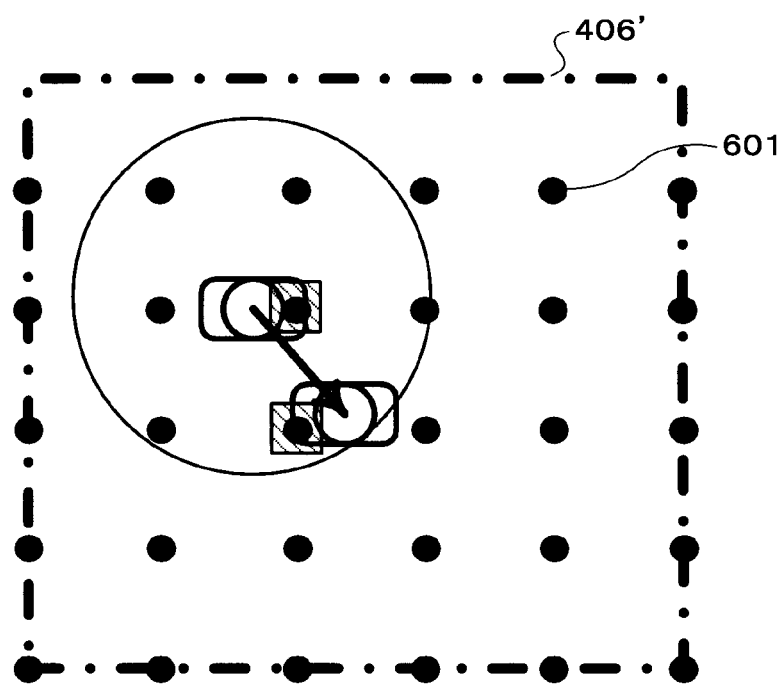
FIG. 8 It depicts a schematic diagram for explaining a method for aggregating the image feature value change amounts at each position.

FIG. 8 is an explanatory drawing showing an example of setting a plurality of measurement reference points in the floor surface region 406' in the shooting area. For example, the boundary information calculation unit 24 may set a plurality of measurement reference points 601 in the floor surface region 406' in the shooting area as shown in FIG. 8, make association with positional information closest to each measurement reference point 601, successively calculate the image feature value change amounts between adjacent measurement reference points 601, and aggregate the calculated image feature value change amounts. In cases where the change amount is calculated for each arbitrarily set measurement reference point, change amounts between such measurement reference points may be calculated by means of interpolation.

The boundary information calculation unit 24 classifies regions (region classification) based on the representative value of the image feature value change amount at each position which has been calculated as above. For example, the boundary information calculation unit 24 may perform threshold processing on the representative value of the image feature value change amount in regard to each of the determined positions and regard a continuous region in which the change amount is judged to be small as one color-stable region. The boundary information calculation unit 24 may also be configured to perform the threshold processing, regard boundaries of regions whose change amount is large as boundary regions, and regard each region partitioned by boundary regions and having a prescribed size or more as a color-stable region, for example.

Figure 9:
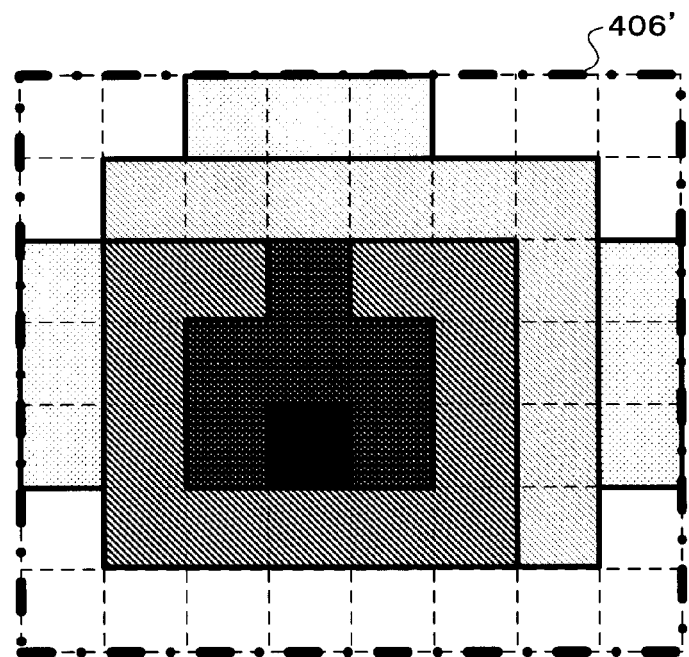
FIG. 9 It depicts an explanatory drawing showing an example of the result of the aggregation of the image feature value change amounts.

FIG. 9 is an explanatory drawing showing an example of the result of the aggregation of the image feature value change amounts. In the example of FIG. 9, as the result of classifying the regions based on the representative value of the image feature value change amounts of each partial region, adjoining regions whose image feature value change amount is a prescribed value or less are indicated with the same type of hatching. Further, in the example of FIG. 9, the boundary with adjacent regions whose image feature value change amount is a prescribed value or more is indicated by solid lines as boundary positions. Thus, in FIG. 9, each region surrounded by solid lines corresponds to one color-stable region. In the example of FIG. 9, each region that is not hatched because of the relationship with the shooting region is also regarded as a color-stable region. As a result, a total of ten color-stable regions are detected.

Figure 10:
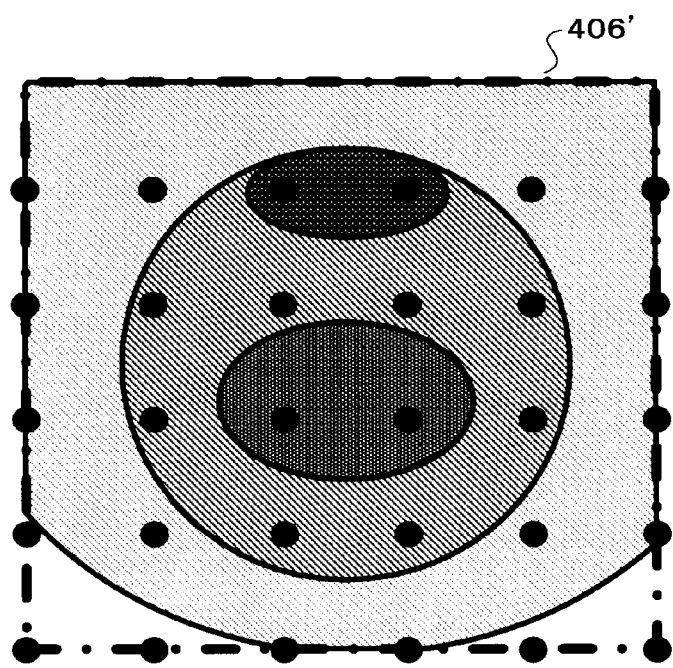
FIG. 10 It depicts an explanatory drawing showing another example of the result of the aggregation of the image feature value change amounts.

FIG. 10 is an explanatory drawing showing another example of the result of the aggregation of the image feature value change amounts. FIG. 10 shows an example of the result of aggregating the image feature value change amounts calculated for each of measurement reference points arranged at even intervals. In the example of FIG. 10, the regions were classified after conducting the interpolation based on the image feature value change amount calculated for each measurement reference point. As a result, the boundary with adjacent regions whose image feature value change amount is a prescribed value or more is indicated by solid lines as boundary positions, and each region partitioned by such boundary positions is indicated as one color-stable region. Thus, in the example of FIG. 10, each region surrounded by solid lines corresponds to one color-stable region. In the example of FIG. 10, each region that is not hatched because of the relationship with the shooting region is also regarded as a color-stable region. As a result, a total of six color-stable regions are detected.

The inter-region color conversion parameter calculation unit 25 calculates color conversion parameters as parameters for converting colors between color-stable regions. The color conversion parameters are parameters used for converting colors in an image. In this exemplary embodiment, the color conversion parameters are parameters for absorbing the illumination condition difference between regions under consideration and expressing the color of the same object (in the image) in the same color tone in both of the regions. The color conversion parameters can be regarded as a type of color correction parameters in the sense that the color tone of one region is corrected with reference to the color tone of the other region.

The inter-region color conversion parameter calculation unit 25 calculates the color conversion parameters between color-stable regions based on the position-specific image feature values stored in the position-specific image feature value storage unit 23. In cases where the conversion parameters are calculated by using multiple image feature values, the inter-region color conversion parameter calculation unit 25 may perform the calculation so that the error becomes the minimum in each color-stable region. The least-squares method, robust estimation, RANSAC, etc. are usable for the calculation of the color conversion parameters.

Figure 11:
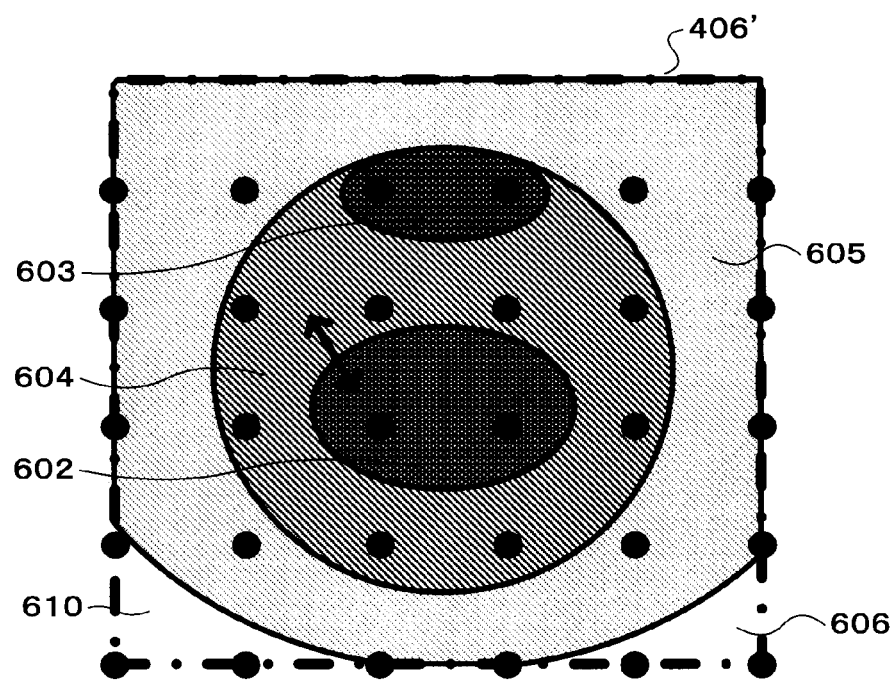
FIG. 11 It depicts a schematic diagram for explaining a method for calculating color conversion parameters between regions.

For example, when the color conversion parameters between the color-stable regions 602 and 604 are calculated as indicated by the arrow in FIG. 11, the inter-region color conversion parameter calculation unit 25 may collect the image feature values of multiple objects in the two color-stable regions 602 and 604 and calculate a conversion formula for converting the image feature values in the color-stable region 602 into the image feature values in the color-stable region 604 and a conversion formula for converting the image feature values in the color-stable region 604 into the image feature values in the color-stable region 602 based on the collected image feature values. In cases where one of the conversion formulas is determined by the other of the conversion formulas, calculating only one of the conversion formulas is sufficient. FIG. 11 is a schematic diagram for explaining the method for calculating the color conversion parameters between regions.

The color correction unit 28 corrects the colors in the image in regard to each region so that the color tone of the same object does not change between color-stable regions or the color tone in each color-stable region becomes close to that of the reference colors, by using the region-specific color conversion parameters (the color conversion parameters for each region) calculated by the inter-region color conversion parameter calculation unit 25 or the region-specific color correction parameters calculated by the region-specific color correction parameter calculation unit 27 which will be explained later.

Figure 12:
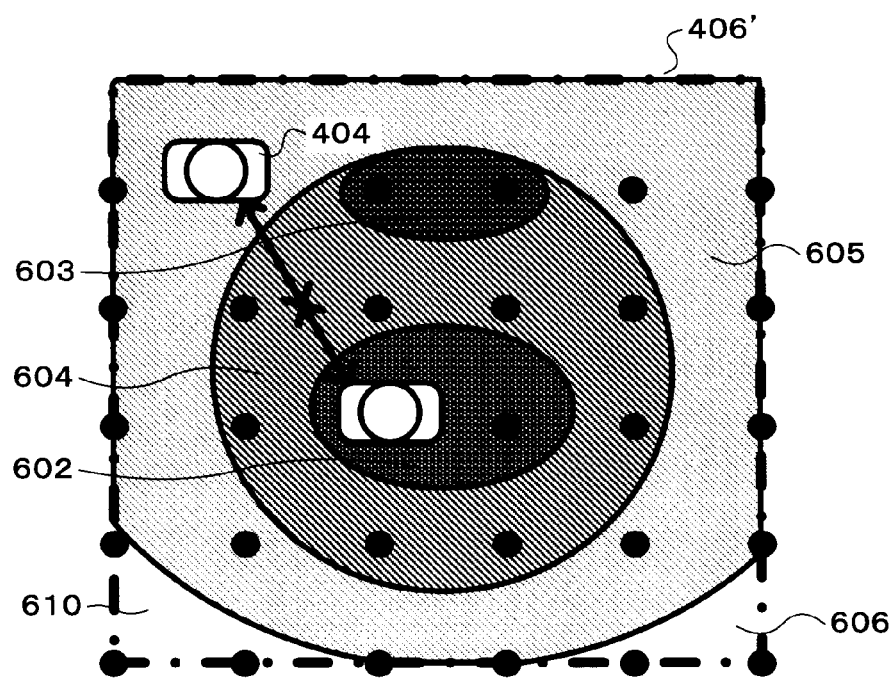
FIG. 12 It depicts a schematic diagram for explaining a method for calculating color conversion parameters between regions.

For example, when the color tone of a particular object should be prevented from changing in a destination region (region as a destination of movement), the color correction unit 28 may convert the color of the object in regard to each color-stable region along the path of the movement of the object by using the color conversion parameters between color-stable regions calculated by the inter-region color conversion parameter calculation unit 25. For example, there can be a request for eliminating the color change between regions for the purpose of grasping the color of the person 404 in a particular color-stable region like the one shown in FIG. 12. In such cases, the color correction unit 28 has only to successively perform color conversion (between a source color-stable region and a destination color-stable region) along the path of the movement of the person 404. In the example of FIG. 12, it is only necessary to perform a total of two color conversions: color conversion between the color-stable regions 605 and 604 and color conversion between the color-stable regions 604 and 602. FIG. 12 is a schematic diagram for explaining the method for calculating the color conversion parameters between color-stable regions.

In cases where color conversion parameters for the correction into the color tone under the reference light source (light source as the reference) have already been calculated by the specified position color correction parameter calculation unit 26 and the region-specific color correction parameter calculation unit 27 which will be explained below, the color correction unit 28 may perform the color conversion by using the calculated region-specific color correction parameters. With the parameters, the color tone in each color-stable region in the image can be converted into the color tone under the reference light source.

Upon receiving an input image in which an object having a color whose color development status (e.g., image feature values) under a reference illumination condition (e.g., in the sunlight) has already been grasped (hereinafter referred to as a "reference color") is situated in a color-stable region, the specified position color correction parameter calculation unit 26 calculates color correction parameters in the color-stable region for the purpose of making the color development status in the color-stable region approach the color development status under the reference illumination condition by comparing the color development status of the reference color of the object in the color-stable region with the color development status under the reference illumination condition. In this case, the input image can be any type of image as long as its shooting area is identical with or partially overlaps with the shooting area of the video images in which the moving object was detected.

For example, upon receiving an input image in which an object B having a reference color is situated in a color-stable region A, the specified position color correction parameter calculation unit 26 calculates the color (image feature values) of the object B in the color-stable region A from the input image in order to grasp the color development status of the object B in the color-stable region A in the image. The color correction parameters in the color-stable region A can be calculated by calculating the amounts of change between the image feature values under the reference illumination condition and the calculated image feature values in the color-stable region A in regard to the colors of the object B. The object B in this example can also be a color chart.

The region-specific color correction parameter calculation unit 27 calculates the color correction parameters for the conversion from the color development status in the color-stable region into the color development status under the reference illumination condition in regard to each color-stable region, based on the inter-region color conversion parameters (color conversion parameters between regions) calculated by the inter-region color conversion parameter calculation unit 25 and the specified position color correction parameter (color correction parameters at a specified position) calculated by the specified position color correction parameter calculation unit 26. For example, as indicated by the arrows in FIG. 13, when the color development status of a reference color has been grasped in a color-stable region 603, the color correction parameters between the color-stable region 603 and an adjacent color-stable region 604 may be calculated based on the color correction parameters of the color-stable region 603 calculated by the grasping of the color development status of the reference color and the color conversion parameters between the regions (i.e., the color conversion parameters between the color-stable regions 603 and 604). Similarly, the color correction parameters between the color-stable region 604 (for which the color correction parameters have been calculated) and an adjacent color-stable region 602 may be calculated based on the calculated color correction parameters of the color-stable region 604 and the color conversion parameters between the regions (i.e., the color conversion parameters between the color-stable regions 604 and 602). Similarly, the color correction parameters between the color-stable region 604 (for which the color correction parameters have been calculated) and an adjacent color-stable region 605 may be calculated based on the calculated color correction parameters of the color-stable region 604 and the color conversion parameters between the regions (i.e., the color conversion parameters between the color-stable regions 604 and 605). Similarly, the color correction parameters between the color-stable region 605 (for which the color correction parameters have been calculated) and an adjacent color-stable region 606 may be calculated based on the calculated color correction parameters of the color-stable region 605 and the color conversion parameters between the regions (i.e., the color conversion parameters between the color-stable regions 605 and 606). Similarly, the color correction parameters between the color-stable region 605 (for which the color correction parameters have been calculated) and an adjacent color-stable region 607 may be calculated based on the calculated color correction parameters of the color-stable region 605 and the color conversion parameters between the regions (i.e., the color conversion parameters between the color-stable regions 605 and 607). As above, the color correction parameters of each color-stable region can be obtained by carrying out the calculation of the color conversion parameters from the first color-stable region (where the calculation was made by the grasping of the object color) successively into adjoining color-stable regions. The calculation of the color correction parameters of each color-stable region may be performed similarly to the method for calculating the color conversion parameters.

In this exemplary embodiment, the moving object region extraction unit 21, the moving object identification unit 22, the boundary information calculation unit 24, the inter-region color conversion parameter calculation unit 25, the specified position color correction parameter calculation unit 26, the region-specific color correction parameter calculation unit 27 and the color correction unit 28 are implemented by, for example, an information processing device (e.g., CPU) operating according to a program. The position-specific image feature value storage unit 23 is implemented by a storage device.

The color correction device may also comprise a display control unit (unshown) which makes a display device display the color-stable regions in a style in which the boundary of each of the color-stable regions is recognizable as shown in FIG. 9 and FIG. 10. For example, when the display control unit has made the display device display a screen like the one shown in FIG. 10, the color correction device may receive the user's input (e.g., mouse clicking) specifying the color-stable regions 605 and 604 (see FIG. 12) and then execute the color correction process between the color-stable regions specified by the user.

Figure 14:
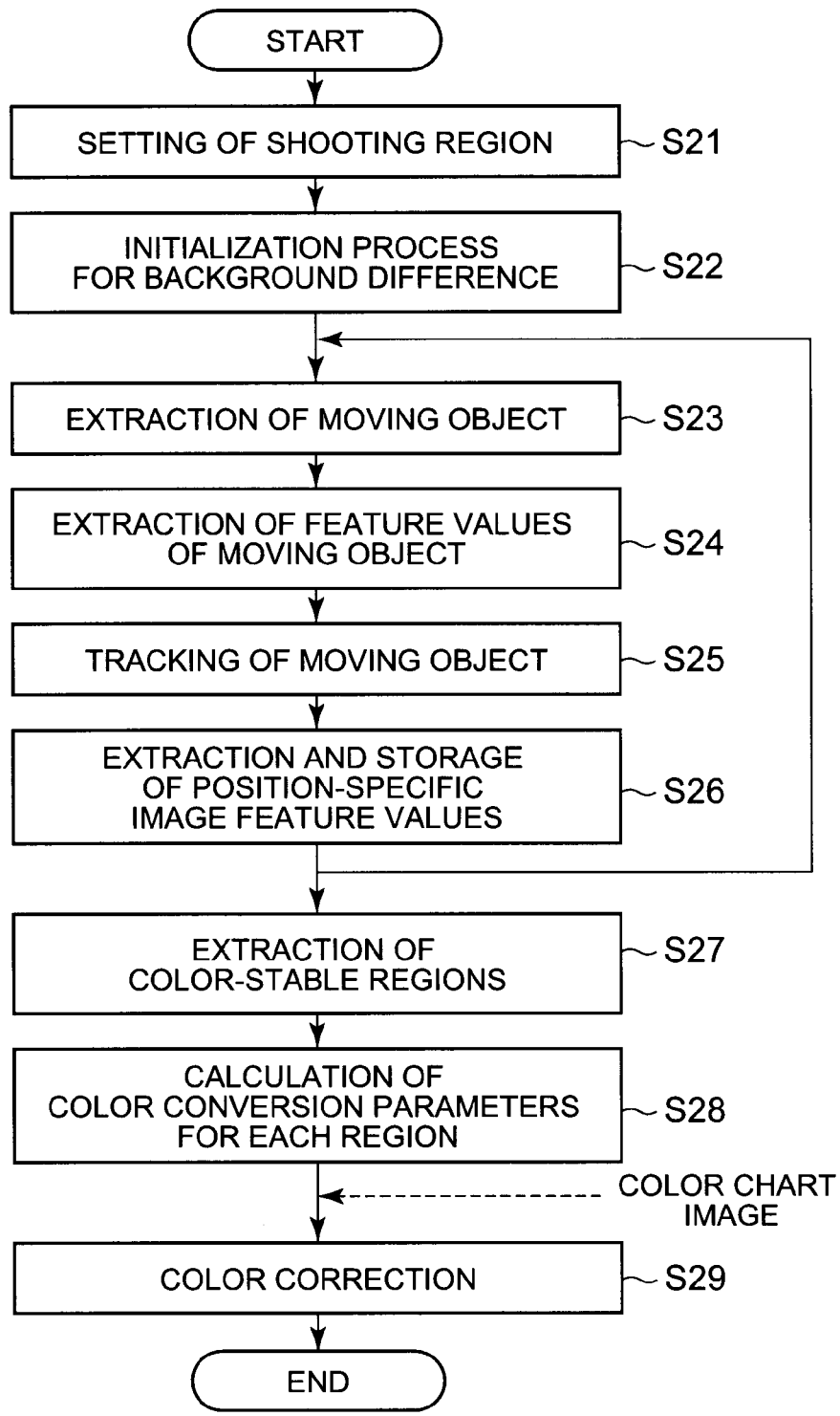
FIG. 14 It depicts a flow chart showing an example of the operation of the color correction device in the second exemplary embodiment.

Next, the operation of this exemplary embodiment will be explained below. FIG. 14 is a flow chart showing an example of the operation of this exemplary embodiment. In the example shown in FIG. 14, the setting of the shooting region is made first along with the camera setting (step S21). In this step, the camera parameters may also be inputted.

Subsequently, an initialization process for detecting the background difference is conducted (step S22). In this process, video obtained by shooting the background only is inputted (together with information indicating that the video is background video) so that the background difference can be detected in the tracking process.

After such an initialization process is finished, video images shot by the same fixed camera (as the camera that shot the correction target image) are inputted and a moving object extraction process is conducted (step S23). In the step S23, the moving object region extraction unit 21 extracts the object region from the input video images. The extraction of the object region may either be conducted for each frame or at certain time intervals in the video.

After extracting the object region, the moving object region extraction unit 21 extracts the image feature values representing color from the extracted object region while also extracting the edge feature values as needed (step S24). The image feature values extracted in this step are stored in the position-specific image feature value storage unit 23 in step S26 together with information specifying the position of the object region in the shooting frame.

After the extraction of the object region, the moving object identification unit 22 performs the tracking of the moving object in the input video images based on the image feature values of the object region extracted in the step S24 (step S25). The moving object identification unit 22 assigns an ID (indicating the identity) to moving objects extracted from frames if the identity of the moving objects (whose position changes from frame to frame) is confirmed by the identification process, and stores the assigned ID (moving object identifier), information specifying the position of the object region in the shooting frame, the image feature values at the position, and information representing the shooting time or the time in the video in the position-specific image feature value storage unit 23 while associating them with one another (step S26). It is also possible to store information specifying the position of the moving object in the shooting region instead of or together with the information specifying the position of the object region in the shooting frame.

The process from the step S23 to the step S26 is executed for multiple moving objects.

When the information in regard to the multiple moving objects has been stored in the position-specific image feature value storage unit 23, the boundary information calculation unit 24 extracts the color-stable regions (step S27). For example, the boundary information calculation unit 24 may estimate the color-stable regions by calculating the boundary regions (where color change occurs in the shooting region) based on the information associating the object position with the image feature values representing color which has been stored in the position-specific image feature value storage unit 23.

After the completion of the color-stable region estimation process, the inter-region color conversion parameter calculation unit 25 calculates the color conversion parameters between color-stable regions based on the position-specific image feature values stored in the position-specific image feature value storage unit 23 (step S28).

After the calculation of the color conversion parameters between color-stable regions, the color correction unit 28 makes the correction of the colors in the image in regard to each region, based on the calculated color conversion parameters between color-stable regions (step S29). In cases where a color chart image including a reference color has already been inputted, the color correction unit 28 may first make the specified position color correction parameter calculation unit 26 and the region-specific color correction parameter calculation unit 27 calculate the color correction parameters of each color-stable region by use of the inputted color chart image and the calculated color conversion parameters between color-stable regions and then make the correction of the colors in the image in regard to each region based on the calculated color correction parameters of each color-stable region.

The color chart image can be an image that was shot in the initial shooting for detecting the background difference, for example. In other words, an image obtained by shooting a color chart (including a reference color) together with the background may be inputted first as an initial image.

As described above, according to this exemplary embodiment, the color change of the moving object at each position is grasped, the color-stable regions are estimated based on the status of the change at each position, and the color conversion parameters between color-stable regions are calculated based on the color of each color-stable region at each position. Therefore, if the color correction is made for each region based on the calculated color conversion parameters between color-stable regions, even in cases where light is incident upon the shooting area of the fixed camera (e.g., surveillance camera) from multiple types of light sources, the color tone varying in one image due to the influence of the light can be corrected with ease.

Also in this exemplary embodiment, the moving object region extraction unit 21 extracts the image color change feature at each position and at each time and the boundary information calculation unit 24 performs the estimation of the color-stable regions in regard to each position and each time based on the result of the extraction by the moving object region extraction unit 21. Consequently, the color correction device is enabled to properly deal with the changes in the light source(s) along with the passage of time.

Figure 15:
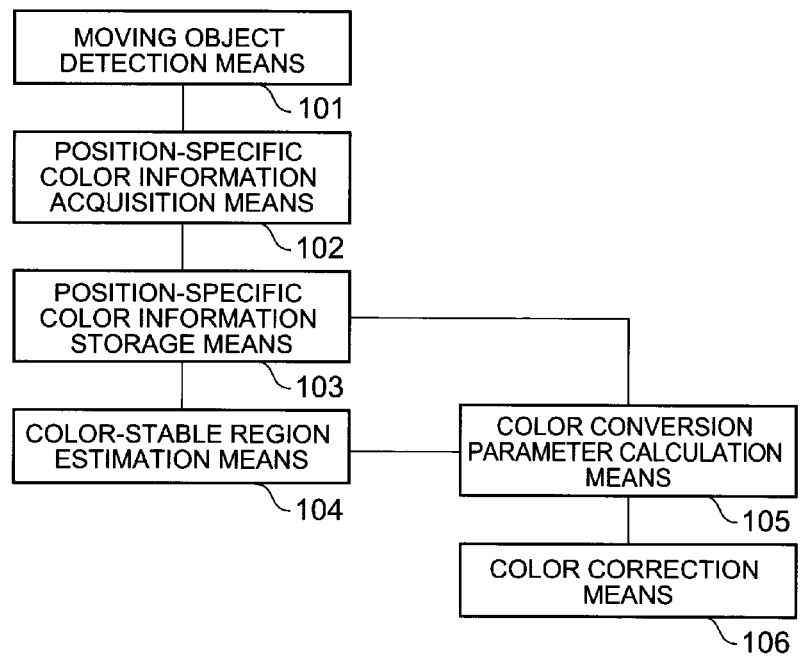
FIG. 15 It depicts a block diagram showing the outline of the present invention.
Figure 16:
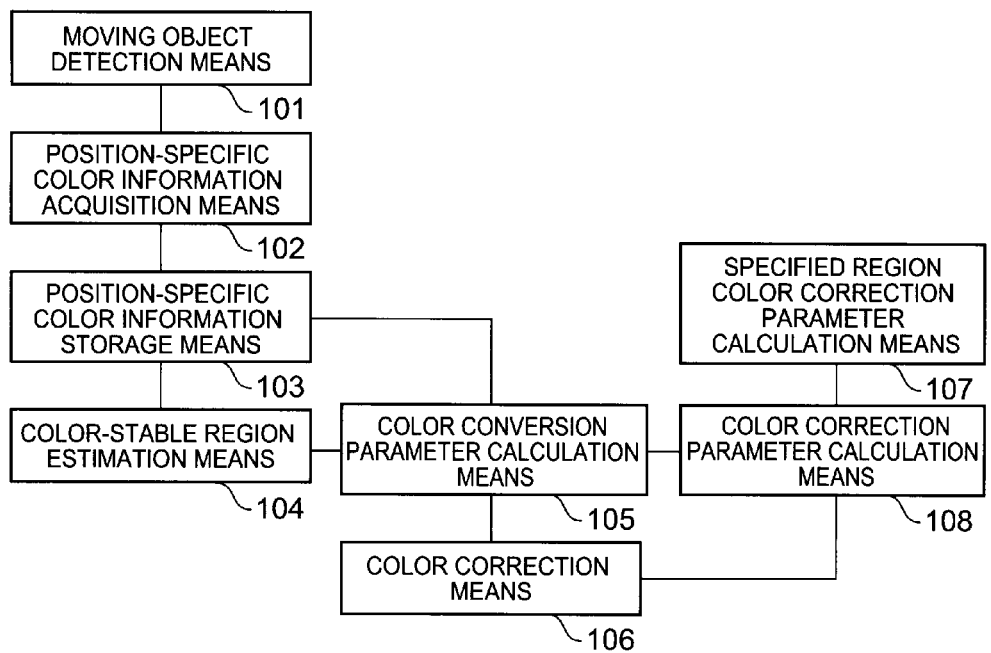
FIG. 16 It depicts a block diagram showing the outline of the present invention.

Next, the outline of the present invention will be explained below. FIGS. 15 and 16 are block diagrams showing the outline of the present invention. As shown in FIG. 15, the color correction device in accordance with the present invention comprises moving object detection means 101, position-specific color information acquisition means 102, position-specific color information storage means 103, color-stable region estimation means 104, color conversion parameter calculation means 105, and color correction means 106.

The moving object detection means 101 (e.g., the position-specific color change feature extraction unit 1 or the moving object region extraction unit 21) detects a moving object in video images whose shooting area is identical with or entirely includes the shooting area of a correction target image.

The position-specific color information acquisition means 102 (e.g., the position-specific color change feature extraction unit 1 or the moving object identification unit 22) judges the identity of the moving object detected by the moving object detection means 101 in the video images and thereby acquires the position of the moving object along with its movement and information representing the color of the moving object in each image.

The position-specific color information storage means 103 (e.g., the position-specific image feature value storage unit 23) stores the position of the moving object along with its movement and the information representing the color of the moving object in each image acquired by the position-specific color information acquisition means 102 while associating them with each other.

The color-stable region estimation means 104 (e.g., the color-stable region estimation unit 2 or the boundary information calculation unit 24) estimates color-stable regions, as regions in the shooting area where color is stable, based on the information associating the position of the moving object along with its movement and the information representing the color of the moving object in each image with each other which has been stored in the position-specific color information storage means 103.

The color conversion parameter calculation means 105 (e.g., the region-specific color correction parameter calculation unit 3 or the inter-region color conversion parameter calculation unit 25) calculates color conversion parameters, as parameters for converting colors between color-stable regions, based on the result of the estimation by the color-stable region estimation means 104 and the information representing the relationship between the position and the color of the moving object which has been stored in the position-specific color information storage means 103. For example, the color conversion parameter calculation means 105 calculates the color conversion parameters as the parameters for converting colors between color-stable regions by referring to information representing the color of the moving object in each color-stable region from the position-specific color information storage means 103 based on the result of the estimation by the color-stable region estimation means 104.

The color correction means 106 (e.g., the color correction unit 4 or the color correction unit 28) corrects colors of the correction target image by using the color conversion parameters between color-stable regions calculated by the color conversion parameter calculation means 105.

With such a configuration, the color tone varying in images shot by one camera can be corrected with ease. For example, correction for preventing the color tone of the same object from changing from region to region can be made with ease. Further, correction for adjusting the color tone of each region to the color tone of a certain partial region can also be made with ease, for example.

The color correction device in accordance with the present invention may also be configured as shown in FIG. 16. The color correction device shown in FIG. 16 further comprises specified region color correction parameter calculation means 107 and color correction parameter calculation means 108 in addition to the configuration shown in FIG. 15.

The specified region color correction parameter calculation means 107 (e.g., the specified position color correction parameter calculation unit 26) calculates color correction parameters, as parameters for making color development status in at least one color-stable region approach color development status under a reference illumination condition, from an image whose shooting area is identical with or partially overlaps with the shooting area of the video images used for the detection of the moving object and in which an object having a reference color is situated in a color-stable region.

The color correction parameter calculation means 108 (e.g., the region-specific color correction parameter calculation unit 27) calculates color correction parameters for each color-stable region based on the color correction parameters for one color-stable region calculated by the specified region color correction parameter calculation means 107 and the color conversion parameters between color-stable regions calculated by the color conversion parameter calculation means 105.

In such a configuration, the color correction means 106 may also correct the colors of the correction target image in regard to each color-stable region by using the color correction parameters for each color-stable region calculated by the color correction parameter calculation means 108.

With such a configuration, the color tone of each region varying in images shot by one camera can be corrected to the color tone under a reference illumination condition.

The color-stable region estimation means 104 may also be configured to aggregate the amounts of change in information representing color occurring between each position and adjacent positions based on the information representing the relationship between the position and the color of the moving object which has been stored in the position-specific color information storage means 103 and estimate the color-stable regions by extracting positions where color change occurs in the shooting region based on the result of the aggregation.

The color-stable region estimation means 104 may also be configured to generate an image feature value change model representing a color feature change amount at each position based on the information representing the relationship between the position and the color of the moving object which has been stored in the position-specific color information storage means 103 and estimate the color-stable regions based on the color feature change amount at each position represented by the generated image feature value change model.

The position-specific color information acquisition means 102 may also be configured to acquire information representing the color of a specified position of the moving object as the information representing the color of the moving object.

It is also possible to configure the position-specific color information acquisition means 102 to acquire the position of the moving object along with its movement, the information representing the color of the moving object in each image, and the time of the shooting of each image and to configure the color-stable region estimation means 104 to estimate time-specific color-stable regions based on the information representing the relationship between the position and the color of the moving object which has been acquired by the position-specific color information acquisition means 102 and stored in the position-specific color information storage means 103. The estimation of the time-specific color-stable regions may be conducted automatically at appropriate times along the passage of real time. For example, the color correction device may be configured to conduct the estimation of the color-stable regions and the color correction process automatically at noon, at 3 p.m., at 5 p.m., and thereafter every hour until midnight. With such a configuration, the color correction device in accordance with the present invention is enabled to automatically make corrections to the color change in images occurring depending on the outdoor weather, the time slot (time of day), etc.

The position-specific color information acquisition means 102 may also be configured to acquire positional information on a lower end part of the object region as information representing the position of the moving object.

Part or all of each of the above exemplary embodiments can be described like, but not restricted to, the following appendixes:

Appendix 1

A color correction device comprising: moving object detection means which detects a moving object in video images whose shooting area is identical with or entirely includes the shooting area of a correction target image; position-specific color information acquisition means which judges the identity of the moving object detected by the moving object detection means in the video images and thereby acquires the position of the moving object along with its movement and information representing the color of the moving object in each image; position-specific color information storage means which stores the position of the moving object along with its movement and the information representing the color of the moving object in each image acquired by the position-specific color information acquisition means while associating them with each other; color-stable region estimation means which estimates color-stable regions, as regions in the shooting area where color is stable, based on the information representing the relationship between the position and the color of the moving object which has been stored in the position-specific color information storage means; color conversion parameter calculation means which calculates color conversion parameters, as parameters for converting colors between color-stable regions, based on the result of the estimation by the color-stable region estimation means and the information representing the relationship between the position and the color of the moving object which has been stored in the position-specific color information storage means; and color correction means which corrects colors of the correction target image by using the color conversion parameters between color-stable regions calculated by the color conversion parameter calculation means.

Appendix 2

The color correction device according to appendix 1, comprising: specified region color correction parameter calculation means which calculates color correction parameters, as parameters for making color development status in at least one color-stable region approach color development status under a reference illumination condition, from an image whose shooting area is identical with or partially overlaps with the shooting area of the video images used for the detection of the moving object and in which an object having a reference color is situated in a color-stable region; and color correction parameter calculation means which calculates color correction parameters for each color-stable region based on the color correction parameters for one color-stable region calculated by the specified region color correction parameter calculation means and the color conversion parameters between color-stable regions calculated by the color conversion parameter calculation means, wherein the color correction means corrects the colors of the correction target image by using the color correction parameters for each color-stable region calculated by the color correction parameter calculation means.

Appendix 3

The color correction device according to appendix 1 or 2, wherein the color-stable region estimation means aggregates the amounts of change in information representing color occurring between each position and adjacent positions based on the information representing the relationship between the position and the color of the moving object which has been stored in the position-specific color information storage means and estimates the color-stable regions by extracting positions where color change occurs in the shooting region based on the result of the aggregation.

Appendix 4

The color correction device according to appendix 1 or 2, wherein the color-stable region estimation means generates an image feature value change model representing a color feature change amount at each position based on the information representing the relationship between the position and the color of the moving object which has been stored in the position-specific color information storage means and estimates the color-stable regions based on the color feature change amount at each position represented by the generated image feature value change model.

Appendix 5

The color correction device according to any one of appendixes 1 to 4, wherein the position-specific color information acquisition means acquires information representing the color of a specified position of the moving object as the information representing the color of the moving object.

Appendix 6

The color correction device according to any one of appendixes 1 to 5, wherein the position-specific color information acquisition means acquires the position of the moving object along with its movement, the information representing the color of the moving object in each image, and the time of the shooting of each image, and the color-stable region estimation means estimates time-specific color-stable regions based on the information representing the relationship among the position, the color and the time regarding the moving object acquired by the position-specific color information acquisition means.

Appendix 7

The color correction device according to any one of appendixes 1 to 6, wherein the position-specific color information acquisition means acquires positional information on a lower end part of an object region as information representing the position of the moving object.

Appendix 8

A color correction method comprising: detecting a moving object in video images whose shooting area is identical with or entirely includes the shooting area of a correction target image; judging the identity of the detected moving object in the video images, thereby acquiring the position of the moving object along with its movement and information representing the color of the moving object in each image, and storing the position of the moving object along with its movement and the information representing the color of the moving object in each image in storage means while associating them with each other; estimating color-stable regions, as regions in the shooting area where color is stable, based on the information representing the relationship between the position and the color of the moving object which has been stored in the storage means; calculating color conversion parameters, as parameters for converting colors between color-stable regions, based on the result of the estimation of the color-stable regions and the information representing the relationship between the position and the color of the moving object which has been stored in the storage means; and correcting colors of the correction target image by using the calculated color conversion parameters between color-stable regions.

Appendix 9

The color correction method according to appendix 8, wherein color correction parameters as parameters for making color development status in at least one color-stable region approach color development status under a reference illumination condition are calculated from an image whose shooting area is identical with or partially overlaps with the shooting area of the video images used for the detection of the moving object and in which an object having a reference color is situated in a color-stable region, color correction parameters are calculated for each color-stable region based on the calculated color correction parameters for at least one color-stable region and the color conversion parameters between color-stable regions, and the colors of the correction target image are corrected by using the calculated color correction parameters for each color-stable region.

Appendix 10

The color correction method according to appendix 8 or 9, wherein the amounts of change in information representing color occurring between each position and adjacent positions are aggregated based on the information representing the relationship between the position and the color of the moving object which has been stored in the storage means, and the color-stable regions are estimated by extracting positions where color change occurs in the shooting region based on the result of the aggregation.

Appendix 11

The color correction method according to appendix 8 or 9, wherein an image feature value change model representing a color feature change amount at each position is generated based on the information representing the relationship between the position and the color of the moving object which has been stored in the storage means, and the color-stable regions are estimated based on the color feature change amount at each position represented by the generated image feature value change model.

Appendix 12

The color correction method according to any one of appendixes 8 to 11, wherein information representing the color of a specified position of the moving object is acquired as the information representing the color of the moving object.

Appendix 13

The color correction method according to any one of appendixes 8 to 12, wherein the position of the moving object along with its movement and the information representing the color of the moving object in each image are acquired together with the time of the shooting of each image, and time-specific color-stable regions are estimated based on the acquired information representing the relationship among the position, the color and the time regarding the moving object.

Appendix 14

The color correction method according to any one of appendixes 8 to 13, wherein positional information on a lower end part of an object region is acquired as information representing the position of the moving object.

Appendix 15

A color correction program for causing a computer to execute: a process of detecting a moving object in video images whose shooting area is identical with or entirely includes the shooting area of a correction target image; a process of judging the identity of the detected moving object in the video images, thereby acquiring the position of the moving object along with its movement and information representing the color of the moving object in each image, and storing the position of the moving object along with its movement and the information representing the color of the moving object in each image in storage means while associating them with each other; a process of estimating color-stable regions, as regions in the shooting area where color is stable, based on the information representing the relationship between the position and the color of the moving object which has been stored in the storage means; a process of calculating color conversion parameters, as parameters for converting colors between color-stable regions, based on the result of the estimation of the color-stable regions and the information representing the relationship between the position and the color of the moving object which has been stored in the storage means; and a process of correcting colors of the correction target image by using the calculated color conversion parameters between color-stable regions.

Appendix 16

The color correction program according to appendix 15, wherein the color correction program causes the computer to execute: a process of calculating color correction parameters, as parameters for making color development status in at least one color-stable region approach color development status under a reference illumination condition, from an image whose shooting area is identical with or partially overlaps with the shooting area of the video images used for the detection of the moving object and in which an object having a reference color is situated in a color-stable region; and a process of calculating color correction parameters for each color-stable region based on the color correction parameters in at least one color-stable region and the color conversion parameters between color-stable regions, wherein the colors of the correction target image are corrected in the color correction process by using the calculated color correction parameters for each color-stable region.

Appendix 17

The color correction program according to appendix 15 or 16, wherein the color correction program causes the computer to aggregate the amounts of change in information representing color occurring between each position and adjacent positions based on the information representing the relationship between the position and the color of the moving object which has been stored in the storage means and estimate the color-stable regions by extracting positions where color change occurs in the shooting region based on the result of the aggregation.

Appendix 18

The color correction program according to appendix 15 or 16, wherein the color correction program causes the computer to generate an image feature value change model representing a color feature change amount at each position based on the information representing the relationship between the position and the color of the moving object which has been stored in the storage means and estimate the color-stable regions based on the color feature change amount at each position represented by the generated image feature value change model.

Appendix 19

The color correction program according to any one of appendixes 15 to 18, wherein the color correction program causes the computer to acquire information representing the color of a specified position of the moving object as the information representing the color of the moving object.

Appendix 20

The color correction program according to any one of appendixes 15 to 19, wherein the color correction program causes the computer to acquire the position of the moving object along with its movement and the information representing the color of the moving object in each image together with the time of the shooting of each image and estimate time-specific color-stable regions based on the acquired information representing the relationship among the position, the color and the time regarding the moving object.

Appendix 21

The color correction program according to any one of appendixes 15 to 20, wherein the color correction program causes the computer to acquire positional information on a lower end part of an object region as information representing the position of the moving object.

Appendix 22

A color correction device comprising: moving object detection means which detects a moving object in video images whose shooting area is identical with or entirely includes the shooting area of a correction target image; position-specific color information acquisition means which judges the identity of the moving object detected by the moving object detection means in the video images and thereby acquires the position of the moving object along with its movement and information representing the color of the moving object in each image; and color-stable region estimation means which estimates a plurality of color-stable regions, as regions in the shooting area where color is stable, based on the acquired information representing the relationship between the position and the color of the moving object.

Appendix 23

The color correction device according to claim 22, comprising display control means which makes a display device display the estimated color-stable regions in a style in which the boundary of each of the color-stable regions is recognizable.

Appendix 24

A color correction method comprising: detecting a moving object in video images whose shooting area is identical with or entirely includes the shooting area of a correction target image; judging the identity of the detected moving object in the video images and thereby acquiring the position of the moving object along with its movement and information representing the color of the moving object in each image; and estimating a plurality of color-stable regions, as regions in the shooting area where color is stable, based on the acquired information representing the relationship between the position and the color of the moving object.

Appendix 25

The color correction method according to appendix 24, wherein the estimated color-stable regions are displayed on a display device in a style in which the boundary of each of the color-stable regions is recognizable.

Appendix 26

A color correction program for causing a computer to execute: a process of detecting a moving object in video images whose shooting area is identical with or entirely includes the shooting area of a correction target image; a process of judging the identity of the detected moving object in the video images and thereby acquiring the position of the moving object along with its movement and information representing the color of the moving object in each image; and a process of estimating a plurality of color-stable regions, as regions in the shooting area where color is stable, based on the acquired information representing the relationship between the position and the color of the moving object.

Appendix 27

The color correction program according to appendix 26, wherein the color correction program causes the computer to execute a process of making a display device display the estimated color-stable regions in a style in which the boundary of each of the color-stable regions is recognizable.

This application claims priority to Japanese Patent Application No. 2012-255981 filed on Nov. 22, 2012, the entire disclosure of which is incorporated herein by reference.

While the present invention has been described above with reference to the exemplary embodiments, the present invention is not to be restricted to the particular illustrative exemplary embodiments. A variety of modifications understandable to those skilled in the art can be made to the configuration and details of the present invention within the scope of the present invention.

INDUSTRIAL APPLICABILITY

The present invention is suitably applicable to analysis of camera images, such as a judgment on the color of clothing or the like (as one of the features of a person) from images shot by a surveillance camera.

REFERENCE SIGNS LIST

1 . . . Position-specific color change feature extraction unit
2 . . . Color-stable region estimation unit
3 . . . Region-specific color correction parameter calculation unit
4 . . . Color correction unit
21 . . . Moving object region extraction unit
22 . . . Moving object identification unit
23 . . . Position-specific image feature value storage unit
24 . . . Boundary information calculation unit
25 . . . Inter-region color conversion parameter calculation unit
26 . . . Specified position color correction parameter calculation unit
27 . . . Region-specific color correction parameter calculation unit
28 . . . Color correction unit
101 . . . Moving object detection means
102 . . . Position-specific color information acquisition means
103 . . . Position-specific color information storage means
104 . . . Color-stable region estimation means
105 . . . Color conversion parameter calculation means
106 . . . Color correction means
107 . . . Specified region color correction parameter calculation means
108 . . . Color correction parameter calculation means

What is claimed is:
1. A color correction device comprising:
a moving object detection unit which detects a moving object in video images whose shooting area is identical with or entirely includes the shooting area of a correction target image;
a position-specific color information acquisition unit which judges the identity of the moving object detected by the moving object detection unit in the video images and thereby acquires the position of the moving object along with its movement and information representing the color of the moving object in each image;
a position-specific color information storage unit which stores the position of the moving object along with its movement and the information representing the color of the moving object in each image acquired by the position-specific color information acquisition unit while associating them with each other;

a color-stable region estimation unit which estimates color-stable regions, as regions in the shooting area where color is stable, based on the information representing the relationship between the position and the color of the moving object which has been stored in the position-specific color information storage unit;

a color conversion parameter calculation unit which calculates color conversion parameters, as parameters for converting colors between color-stable regions, based on the result of the estimation by the color-stable region estimation unit and the information representing the relationship between the position and the color of the moving object which has been stored in the position-specific color information storage unit; and a color correction unit which corrects colors of the correction target image by using the color conversion parameters between color-stable regions calculated by the color conversion parameter calculation unit.

2. The color correction device according to claim 1, comprising:

a specified region color correction parameter calculation unit which calculates color correction parameters, as parameters for making color development status in at least one color-stable region approach color development status under a reference illumination condition, from an image whose shooting area is identical with or partially overlaps with the shooting area of the video images used for the detection of the moving object and in which an object having a reference color is situated in a color-stable region; and a color correction parameter calculation unit which calculates color correction parameters for each color-stable region based on the color correction parameters for one color-stable region calculated by the specified region color correction parameter calculation unit and the color conversion parameters between color-stable regions calculated by the color conversion parameter calculation unit, wherein the color correction unit corrects the colors of the correction target image by using the color correction parameters for each color-stable region calculated by the color correction parameter calculation unit.

3. The color correction device according to claim 1, wherein the color-stable region estimation unit aggregates the amounts of change in information representing color occurring between each position and adjacent positions based on the information representing the relationship between the position and the color of the moving object which has been stored in the position-specific color information storage unit and estimates the color-stable regions by extracting positions where color change occurs in the shooting region based on the result of the aggregation.

4. The color correction device according to claim 1, wherein the color-stable region estimation unit generates an image feature value change model representing a color feature change amount at each position based on the information representing the relationship between the position and the color of the moving object which has been stored in the position-specific color information storage unit and estimates the color-stable regions based on the color feature change amount at each position represented by the generated image feature value change model.

5. The color correction device according to claim 1, wherein the position-specific color information acquisition unit acquires information representing the color of a specified position of the moving object as the information representing the color of the moving object.

6. The color correction device according to claim 1, wherein:

the position-specific color information acquisition unit acquires the position of the moving object along with its movement, the information representing the color of the moving object in each image, and the time of the shooting of each image, and the color-stable region estimation unit estimates time-specific color-stable regions based on the information representing the relationship among the position, the color and the time regarding the moving object acquired by the position-specific color information acquisition unit.

7. The color correction device according to claim 1, wherein the position-specific color information acquisition unit acquires positional information on a lower end part of an object region as information representing the position of the moving object.

8. A color correction method comprising:

detecting a moving object in video images whose shooting area is identical with or entirely includes the shooting area of a correction target image;

judging the identity of the detected moving object in the video images, thereby acquiring the position of the moving object along with its movement and information representing the color of the moving object in each image, and storing the position of the moving object along with its movement and the information representing the color of the moving object in each image in a storage unit while associating them with each other;

estimating color-stable regions, as regions in the shooting area where color is stable, based on the information representing the relationship between the position and the color of the moving object which has been stored in the storage unit;

calculating color conversion parameters, as parameters for converting colors between color-stable regions, based on the result of the estimation of the color-stable regions and the information representing the relationship between the position and the color of the moving object which has been stored in the storage unit; and correcting colors of the correction target image by using the calculated color conversion parameters between color-stable regions.

9. The color correction method according to claim 8, wherein:

color correction parameters as parameters for making color development status in at least one color-stable region approach color development status under a reference illumination condition are calculated from an image whose shooting area is identical with or partially overlaps with the shooting area of the video images used for the detection of the moving object and in which an object having a reference color is situated in a color-stable region, and color correction parameters are calculated for each color-stable region based on the calculated color correction parameters for at least one color-stable region and the color conversion parameters between color-stable regions, and the colors of the correction target image are corrected by using the calculated color correction parameters for each color-stable region.

10. A non-transitory computer-readable recording medium in which a color correction program is recorded, the color correction program causing a computer to execute:

a process of detecting a moving object in video images whose shooting area is identical with or entirely includes the shooting area of a correction target image;

a process of judging the identity of the detected moving object in the video images, thereby acquiring the position of the moving object along with its movement and information representing the color of the moving object in each image, and storing the position of the moving object along with its movement and the information representing the color of the moving object in each image in a storage unit while associating them with each other;

a process of estimating color-stable regions, as regions in the shooting area where color is stable, based on the information representing the relationship between the position and the color of the moving object which has been stored in the storage unit;

a process of calculating color conversion parameters, as parameters for converting colors between color-stable regions, based on the result of the estimation of the color-stable regions and the information representing the relationship between the position and the color of the moving object which has been stored in the storage unit; and a process of correcting colors of the correction target image by using the calculated color conversion parameters between color-stable regions.

11. The non-transitory computer-readable recording medium in which the color correction program is recorded according to claim 10, wherein the color correction program causes the computer to execute:

a process of calculating color correction parameters, as parameters for making color development status in at least one color-stable region approach color development status under a reference illumination condition, from an image whose shooting area is identical with or partially overlaps with the shooting area of the video images used for the detection of the moving object and in which an object having a reference color is situated in a color-stable region; and a process of calculating color correction parameters for each color-stable region based on the color correction parameters in at least one color-stable region and the color conversion parameters between color-stable regions, wherein the colors of the correction target image are corrected in the color correction process by using the calculated color correction parameters for each color-stable region.

12. A color correction device comprising:

a moving object detection unit which detects a moving object in video images whose shooting area is identical with or entirely includes the shooting area of a correction target image;

a position-specific color information acquisition unit which judges the identity of the moving object detected by the moving object detection unit in the video images and thereby acquires the position of the moving object along with its movement and information representing the color of the moving object in each image; and a color-stable region estimation unit which estimates a plurality of color-stable regions, as regions in the shooting area where color is stable, based on the acquired information representing the relationship between the position and the color of the moving object.

13. A color correction method comprising:

detecting a moving object in video images whose shooting area is identical with or entirely includes the shooting area of a correction target image;

judging the identity of the detected moving object in the video images and thereby acquiring the position of the moving object along with its movement and information representing the color of the moving object in each image; and estimating a plurality of color-stable regions, as regions in the shooting area where color is stable, based on the acquired information representing the relationship between the position and the color of the moving object.

14. A non-transitory computer-readable recording medium in which a color correction program is recorded, the color correction program causing a computer to execute:

a process of detecting a moving object in video images whose shooting area is identical with or entirely includes the shooting area of a correction target image;

a process of judging the identity of the detected moving object in the video images and thereby acquiring the position of the moving object along with its movement and information representing the color of the moving object in each image; and a process of estimating a plurality of color-stable regions, as regions in the shooting area where color is stable, based on the acquired information representing the relationship between the position and the color of the moving object.

* * * * *